US010417105B2

(12) United States Patent
Kano et al.

(10) Patent No.: US 10,417,105 B2
(45) Date of Patent: Sep. 17, 2019

(54) CONNECTION CONFIRMATION SYSTEM, CONNECTION DETECTION APPARATUS, AND CONNECTION CONFIRMATION METHOD

(71) Applicant: YAMAHA CORPORATION, Hamamatsu-shi (JP)

(72) Inventors: Masaya Kano, Hamamatsu (JP); Atsushi Usui, Hamamatsu (JP); Yutaka Ishimura, Hamamatsu (JP); Hiroyuki Ichi, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 211 days.

(21) Appl. No.: 15/361,912

(22) Filed: Nov. 28, 2016

(65) Prior Publication Data

US 2017/0075785 A1 Mar. 16, 2017

Related U.S. Application Data

(63) Continuation of application No. PCT/JP2015/065069, filed on May 26, 2015.

(30) Foreign Application Priority Data

May 26, 2014 (JP) ................. 2014-107836

(51) Int. Cl.
*G06F 11/30* (2006.01)
*H04S 5/02* (2006.01)
(Continued)

(52) U.S. Cl.
CPC ...... *G06F 11/3051* (2013.01); *G06F 11/3041* (2013.01); *G06F 13/102* (2013.01); *H04R 29/001* (2013.01); *H04S 5/02* (2013.01)

(58) Field of Classification Search
CPC ........ G06F 13/10; G06F 11/30; G06F 13/102; G06F 11/3041; G06F 11/1351; H04R 29/00; H04S 5/02
See application file for complete search history.

(56) References Cited

U.S. PATENT DOCUMENTS 6,813,577 B2 * 11/2004 Yoshino ............. H04R 5/04
702/111
7,009,942 B2 3/2006 Fujimori et al.
(Continued)

FOREIGN PATENT DOCUMENTS

CN 1471296 A 1/2004
CN 101431546 A 5/2009
(Continued)

OTHER PUBLICATIONS

Office Action issued in Japanese Appln. No. 2016-523507 dated Jan. 9, 2018. English translation provided.
(Continued)

*Primary Examiner* — Henry Tsai
*Assistant Examiner* — Christopher A Daley
(74) *Attorney, Agent, or Firm* — Rossi, Kimms & McDowell LLP

(57) ABSTRACT

A connection confirmation system includes a connection detection apparatus and an information processing apparatus communicable with each other. The connection detection apparatus acquires a setting relating to a connection mode of a device to be connected to a sound processing apparatus, detects a connection mode of a device actually connected to the sound processing apparatus, and determines a difference between the detected actual connection mode and the connection mode indicated by the acquired setting.

10 Claims, 16 Drawing Sheets

(51) Int. Cl.
　　　*G06F 13/10*　　　(2006.01)
　　　*H04R 29/00*　　　(2006.01)

(56) References Cited

U.S. PATENT DOCUMENTS

| | | | |
|---|---|---|---|
| 7,136,948 B2 | 11/2006 | Hirata et al. | |
| 7,170,980 B2 | 1/2007 | Lim | |
| 8,525,691 B2 | 9/2013 | Suga | |
| 9,019,435 B2 * | 4/2015 | Barnett | H04N 5/4403 |
| | | | 348/734 |
| 9,413,733 B2 * | 8/2016 | Sallas | H04L 63/061 |
| 9,544,533 B2 * | 1/2017 | Priest | H04N 7/01 |
| 2001/0021188 A1 * | 9/2001 | Fujimori | G10H 1/0058 |
| | | | 370/389 |
| 2003/0185400 A1 | 10/2003 | Yoshizawa et al. | |
| 2007/0133812 A1 | 6/2007 | Yoshizawa et al. | |
| 2007/0147636 A1 | 6/2007 | Oteki | |
| 2009/0041257 A1 | 2/2009 | Yoshizawa et al. | |
| 2010/0090849 A1 * | 4/2010 | Suga | H04N 21/43635 |
| | | | 340/653 |
| 2011/0074591 A1 * | 3/2011 | Arling | H04N 21/4126 |
| | | | 340/635 |
| 2011/0096935 A1 | 4/2011 | Yoshizawa et al. | |
| 2011/0293113 A1 * | 12/2011 | McCarthy | H03G 3/32 |
| | | | 381/107 |
| 2013/0128124 A1 | 5/2013 | Suzuki et al. | |
| 2014/0107891 A1 * | 4/2014 | Choi | G06F 7/00 |
| | | | 701/36 |
| 2014/0363018 A1 | 12/2014 | Yoshizawa et al. | |
| 2015/0382128 A1 * | 12/2015 | Ridihalgh | H04S 7/301 |
| | | | 381/57 |
| 2016/0142849 A1 * | 5/2016 | Satheesh | H04N 21/439 |
| | | | 381/17 |
| 2017/0171685 A1 * | 6/2017 | Ballard | H04S 7/303 |

FOREIGN PATENT DOCUMENTS

| | | |
|---|---|---|
| EP | 1401153 A1 | 3/2004 |
| JP | 2001203732 A | 7/2001 |
| JP | 2006174094 A | 6/2006 |
| JP | 2007142875 A | 6/2007 |
| JP | 2007300519 A | 11/2007 |
| JP | 2008244819 A | 10/2008 |
| JP | 2010097288 A | 4/2010 |
| JP | 2010154544 A | 7/2010 |
| JP | 2011082717 A | 4/2011 |
| JP | 2013110471 A | 6/2013 |
| JP | 2013150079 A | 8/2013 |

OTHER PUBLICATIONS

Office Action issued in Chinese Appln. No. 201580029170.5 dated Nov. 1, 2017. English Translation provided.

International Search Report issued in Intl. Appln. No. PCT/JP2015/065069, dated Jul. 28, 2015. English translation provided.

Written Opinion issued in Intl. Appln. No. PCT/JP2015/065069, dated Jul. 28, 2015.

Extended European Search Report issued in European Appln. No. 15799806.3 dated Jan. 19, 2018.

Office Action issued in Chinese Appln. No. 201580029170.5 dated Sep. 11, 2018. English translation provided.

* cited by examiner

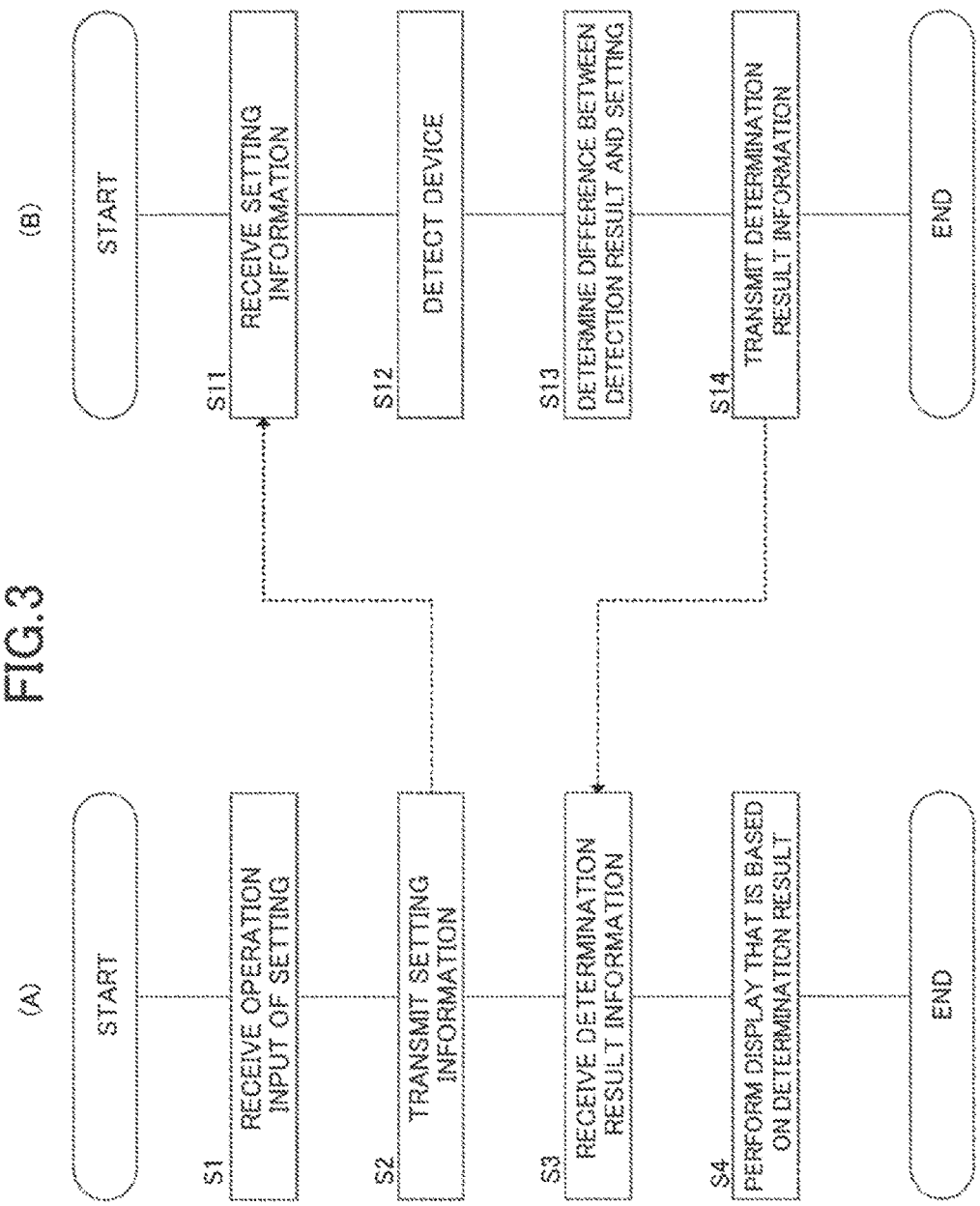

FIG.13

| DEVICE | HDMI TERMINAL |
|---|---|
| BD PLAYER | AV1 |
| STB | AV3 |
| TV MONITOR | HDMI OUT1 |

FIG.14

```
SCENE1
   INPUT:AV1  NAME:BD Player
   HDMI OUT: OUT1=OUTPUT ON, OUT2=OUTPUT OFF
   SOUND FIELD:DSP ON
   OTHER AUDIO PROCESSING: NONE
SCENE2
   INPUT:AV3  NAME:TV Broadcast
   HDMI OUT: OUT1=OUTPUT ON, OUT2=OUTPUT OFF
   SOUND FIELD:Straight
   OTHER AUDIO PROCESSING: DIALOGUE BOOST
```

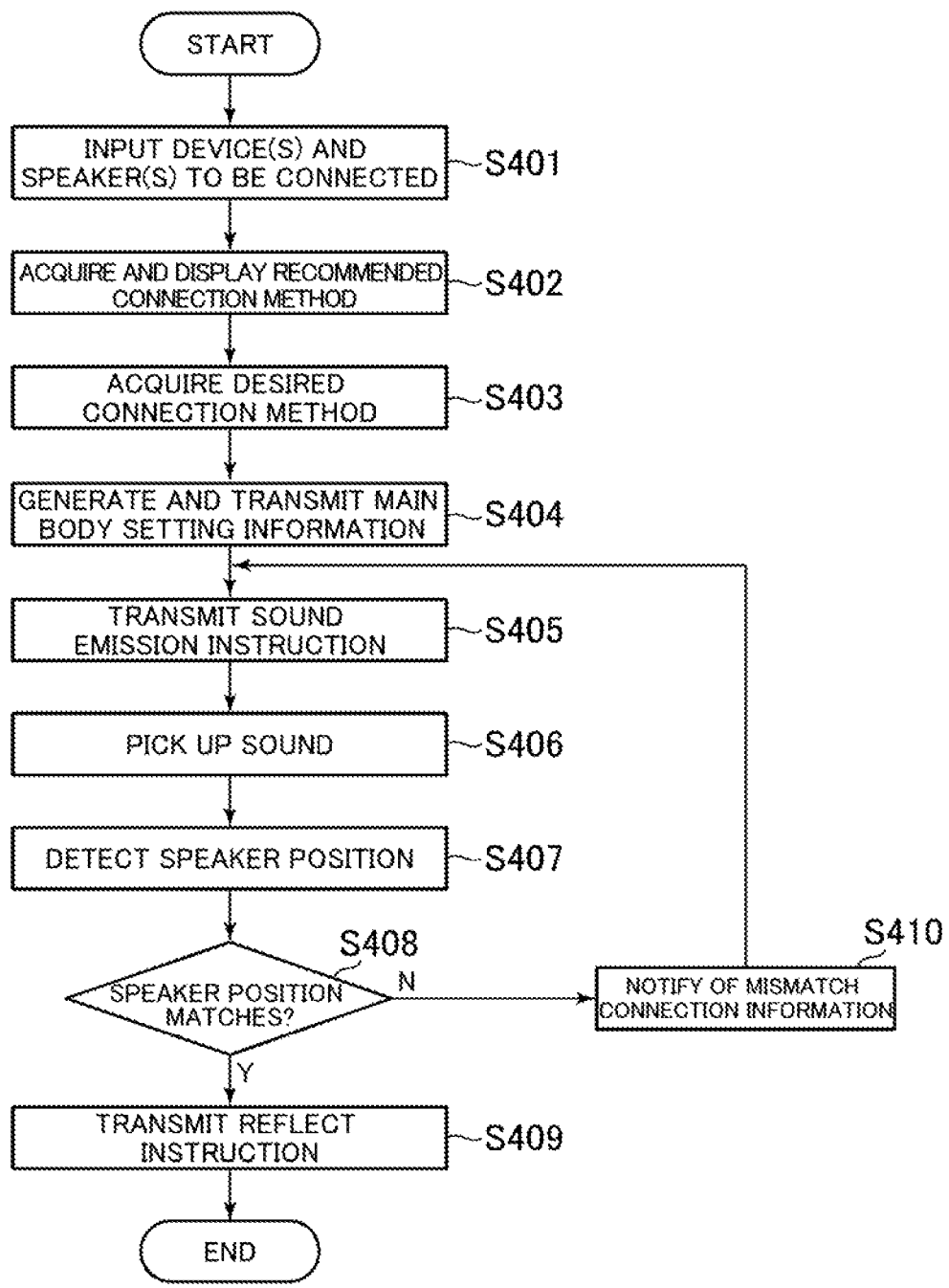

CONNECTION CONFIRMATION SYSTEM, CONNECTION DETECTION APPARATUS, AND CONNECTION CONFIRMATION METHOD

BACKGROUND

Previously, there has been proposed to detect a device connected to an own apparatus. For example, a sound processing apparatus described in Patent Literature 1 (Japanese Patent Application Laid-Open Publication No. JP 2006-174094 A) is configured to detect a speaker actually connected to the apparatus itself by causing the speaker to output a test sound and by picking up the output test sound using a microphone.

The sound processing apparatus described in Patent Literature 1 is configured to automatically correct a connection setting of the own apparatus in accordance with a connection mode of devices actually connected to the own apparatus. More specifically, the sound processing apparatus described in Patent Literature 1 is configured to automatically correct various settings so that, when only front left/right (L/R) speakers and surround L/R speakers are connected to the apparatus, for example, those front L/R speakers and surround L/R speakers are detected, to thereby invalidate the setting of unconnected speakers (e.g., a center (C) channel speaker).

The sound processing apparatus described in Patent Literature 1, however, is configured to automatically correct the setting based only on the actual connection mode, and hence there are cases where the corrected connection mode does not match the connection mode desired by a user.

For example, the user may want to generate a sound field using 7-channel surround sound (front left (FL), front right (FR), center (C), surround left (SL), surround right (SR), surround back left (SBL), and surround back right (SBR) channels), including surround back speakers. In this case, when the user erroneously connects the surround back speakers to presence speaker connectors of the sound processing apparatus, the sound processing apparatus detects that presence speakers are connected, and hence generates the sound field using 7-channel surround sound (FL, FR, C, SL, SR, PL, and PR channels) including presence speakers, which does not conform to the setting intended by the user.

In other words, in this example, as long as the configuration of the connected speakers is not a configuration that cannot be implemented (e.g., a configuration including only an FL speaker and an SL speaker), the sound processing apparatus automatically generates the sound field based on a connection setting including presence speakers. Therefore, such a sound processing apparatus outputs a sound from each detected speaker, but the sounds set to be output from the setting position of the presence speakers are output from the setting position of the surround back speakers. As a result, unless the user notices a difference between a desired connection mode and the actual connection mode, the user cannot obtain the desired sound effect.

Therefore, it is desirable to provide a connection confirmation system, a connection confirmation program, a connection confirmation method, and a connection detection apparatus, which are capable of detecting and informing a user of a difference between a connection mode of a connected device and a connection mode desired by the user.

SUMMARY

One aspect of the present invention is a connection confirmation system, which includes a connection detection apparatus and information processing apparatus. The connection detection apparatus includes a first communication interface, and a first processor configured to implement instructions stored in a first memory. The information processing apparatus includes a display device, a second communication interface, and a second processor configured to implement instructions stored in a second memory.

The connection detection apparatus and the information processing apparatus are configured to communicate with each other using the first and second communication interfaces. The first and second communication interfaces can communicate wirelessly.

The first processor is configured to execute a detection task that detects an actual connection mode of an actually-connected device connected to the connection detection apparatus, and a transmitting task of sending the connection mode detected in the detection task and an input of a setting relating to a desired connection mode of a device to be connected to the connection detection apparatus to the information processing apparatus, using the first communication interface.

The second processor is configured to execute a determination task that determines a difference between the actual connection mode and the desired connection mode, and a display task that controls the display device to display a determination result of the determination task.

Another aspect of the invention is a connection detection apparatus that has a processor configured to implement instructions stored in a memory and perform the detection task mention previously, an acquisition task, and a determining task that is similar to the determining task mentioned previously. The acquisition task acquires a setting relating to a connection mode of a device to be connected to a sound processing apparatus. The determination task determines the difference between the actual connection mode detected by the detection task and the connection mode indicated by the setting acquired by the acquisition task.

The processor is further configured to perform a setting changing task that changes the setting relating to the connection mode based on the actual connection mode.

The determination task determines, upon determining that the actual connection mode detected by the detection task and the connection mode indicated by the setting acquired by the acquisition task are different, whether or not the setting relating to the connection mode is changeable.

The processor is further configured to execute a setting changing task that changes the setting relating to the connection mode when the determining task determines that the setting relating to the connection mode is changeable.

The connection detection apparatus further comprises a display device. The processor is further configured to execute the display task mentioned previously.

The connection detection apparatus can be included in or part of the sound processing apparatus. Alternatively, the connection detection apparatus can be in a form of a portable terminal.

The sound processing apparatus is configured to output to a speaker an audio signal for each channel.

The connection mode comprises a mode of connecting between the sound processing apparatus and the speaker. The detection task can detect an actual connection mode of each channel and the respective speaker by outputting an audio signal of a test sound to the respective speaker and picking up a test sound using a microphone.

The acquisition task can further acquire, from the information processing apparatus, a setting relating to the connection mode of a device to be connected indirectly to the connection detection apparatus.

The detection task can further detect the connection mode of a device actually connected indirectly to the connection detection apparatus.

The determination task can further determine the difference between the connection mode of the device to be indirectly connected as indicated by the setting acquired by the acquisition task and the connection mode of the device actually connected indirectly to the connection detection apparatus detected by the detection task.

Another aspect is a connection confirmation method for the connection detection apparatus and the information processing apparatus. The connection confirmation method comprises a detection step, an acquisition step, a determining step, and a displaying step.

The detection step detects the connection mode of a device actually connected to the connection detection apparatus. The acquisition step acquires an input of a setting relating to the connection mode of a device to be connected to the connection detection apparatus. The determination step determines the difference between the connection mode indicated from the setting received in the acquisition step and the actual connection mode acquired in the detection step. The display step displays on a display device a determination result of the determination step.

BRIEF DESCRIPTION OF THE DRAWINGS

FIG. 3 is a flowchart illustrating operation of the portable terminal (section (A)), and illustrating operation of the AV receiver (section (B)).

FIG. 13 is a diagram showing an example of recommended connection information.

FIG. 14 is a diagram illustrating an example of main body setting information.

FIG. 17 is a flowchart illustrating a modified example of the second embodiment.

DETAILED DESCRIPTION

The present invention relates to a connection confirmation system, a connection confirmation method, and a connection detection apparatus.

Figure 1:
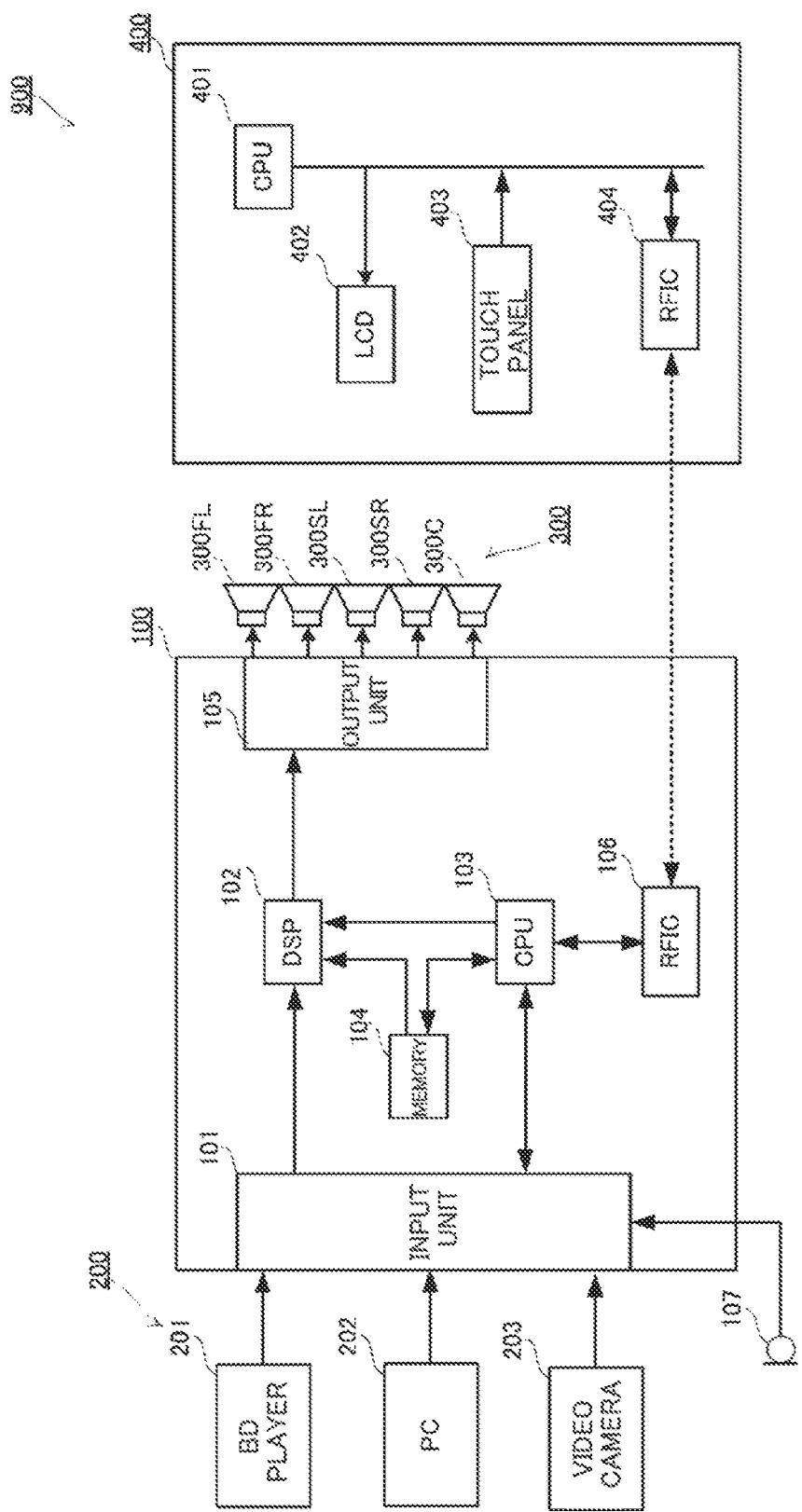
FIG. 1 is a block diagram illustrating a portion of a configuration of a connection confirmation system according to a first embodiment of the present invention.
Figure 2:
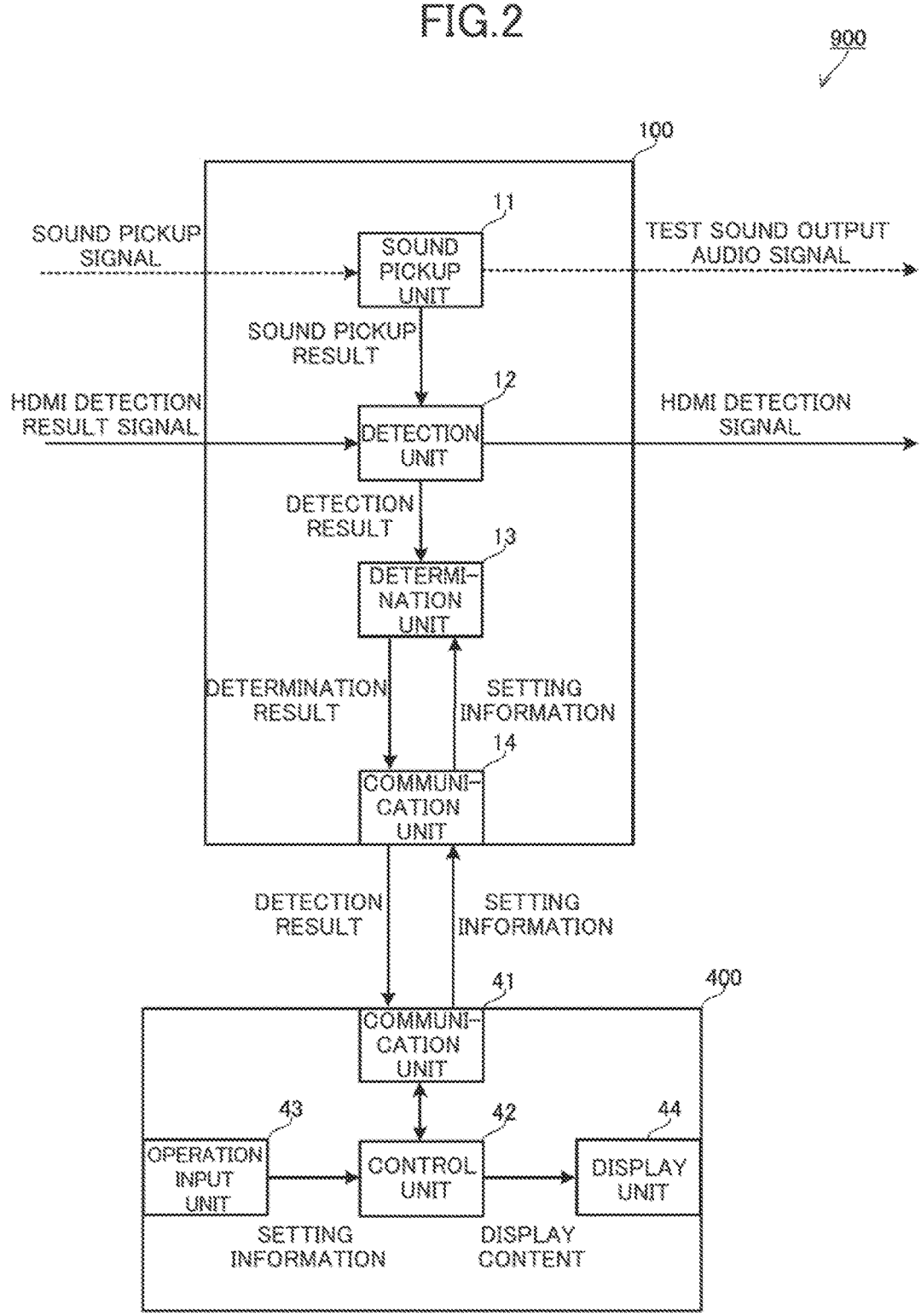
FIG. 2 is a function block diagram of an AV receiver and a portable terminal according to the first embodiment.

A connection confirmation system 900 according to a first embodiment of the present invention is described with reference to FIG. 1, FIG. 2, and FIG. 3. FIG. 1 is a block diagram illustrating a portion of a configuration of the connection confirmation system 900. FIG. 2 is a function block diagram of an AV receiver 100 and a portable terminal 400. FIG. 3 is a flowchart illustrating operation of the portable terminal 400, and operation of the AV receiver 100.

First, an outline of the connection confirmation system 900 is described. In the connection confirmation system 900, the user performs on a portable terminal 400 an operation input of a setting regarding a connection mode of a device to be connected to an audiovisual (AV) receiver 100. The AV receiver 100 is configured to determine a difference between an actual connection mode determined by detecting the devices that are actually connected to the own receiver and the connection mode set by the user. The portable terminal 400 is configured to perform a display on a display device 402 that is based on the determination result. In this manner, the connection confirmation system 900 according to the first embodiment allows the user to confirm whether or not there is an error in the actual connection, and to set the connection mode of the AV receiver 100 to the connection mode that is desired by the user.

As illustrated in FIG. 1, the connection confirmation system 900 includes the AV receiver 100, a plurality of content reproduction devices 200, a plurality of speakers 300, and the portable terminal 400. The AV receiver 100 corresponds to the connection detection apparatus/sound processing apparatus. In FIG. 1, transmission and reception of signals and information via physical cables and internal wiring are represented as the solid lines, and transmission and reception of information by wireless communication are represented as the dotted lines.

The AV receiver 100 includes an input unit/interface 101, a digital signal processor (DSP) 102, a central processing unit (CPU) 103, a memory 104, an output unit/interface 105, and a radio frequency integrated circuit (RFIC) 106 constituting a communication interface.

The input unit 101 is configured to receive content data from each content reproduction device 200, and to output to the DSP 102 an audio signal extracted from the content data. A sound pickup signal from a microphone 107 is input to the input unit 101.

As the plurality of content reproduction devices 200, in this embodiment, a Blu-ray Disc (registered trademark) (BD) player 201, a personal computer (PC) 202, and a video camera 203 are connected to the input unit 101 of the AV receiver 100. Each content reproduction device 200 is connected to a high-definition multimedia interface (HDMI) (registered trademark) connector of the AV receiver 100 via an HDMI cable. The content reproduction devices 200 are not limited to being connected to the input unit 101 by an HDMI cable. For example, the content reproduction devices 200 can be connected to the input unit 101 by another physical cable, such as a digital optical cable or an analog cable. The content reproduction devices 200 are also not limited to being connected to the input unit 101 by a physical cable. For example, the content reproduction devices 200 can be connected to the input unit 101 by wireless communication for transmitting audio signals. As the wireless communication, wireless local area network (LAN) communication and Bluetooth (registered trademark) communication can be employed.

A program is stored in the memory 104. The program is read and executed by the CPU 103. The CPU 103 is configured to control the input unit 101, the DSP 102, the output unit 105, and the RFIC 106 by reading and executing the program.

The output unit 105 is configured to amplify each input audio signal, and to output the amplified audio signals to the plurality of speakers 300 (speaker 300FL, speaker 300SL, speaker 300C, speaker 300SR, and speaker 300FR). In this embodiment, each speaker 300 is connected to a speaker connector of the AV receiver 100 via a speaker cable. But even more speakers can be connected to the output unit 105. For example, a plurality of speakers supporting 7.1 multi-channel surround sound can be connected to the output unit 105. The connection between each of the plurality of speakers 300 and the output unit 105 is not limited to a physical speaker cable. For example, the plurality of speakers 300 and the output unit 105 can be connected by wireless communication (e.g., Bluetooth communication).

The RFIC 106 is configured to transmit and receive various information to and from the portable terminal 400 under the control of the CPU 103 using a wireless communication antenna (not shown) under conventional wireless technology, such as WiFi and Bluetooth.

The DSP 102 is configured to perform, under the control of the CPU 103, predetermined processing (e.g., volume control, equalizer processing, etc.) on each audio signal input from the input unit 101. The user performs settings relating to those processes by using operation buttons (e.g., volume change knob (not shown), frequency change knob (not shown), etc.) on the AV receiver 100. The operation buttons on the AV receiver 100 are specialized for sound processing.

The portable terminal 400 includes a CPU 401, a liquid crystal display (LCD) 402, a touch panel 403, and an RFIC 404. Each of those parts is connected to a shared bus.

The CPU 401 is configured to control the display device (LCD) 402, the touch panel 403, and the RFIC 404 in an integrated manner. The RFIC 404 is configured to transmit and receive various information to and from the RFIC 106 of the AV receiver 100 under the control of the CPU 401 by using a wireless communication antenna (not shown).

The LCD 402 and the touch panel 403 are arranged in an overlapping manner. The CPU 401 is configured to change display content of the LCD 402 based on touch operations by the user received through the touch panel 403. The portable terminal 400 is configured to display a graphical user interface (GUI) based on such processing.

For example, the portable terminal 400 is configured to display, when a setting start operation input is received by the touch panel 403, a setting guidance message and a software keyboard on the LCD 402, and to receive key input operations relating to the setting by the touch panel 403. In this manner, the portable terminal 400 is displaying the GUI, and hence the user can easily input operations relating to the setting.

In this embodiment, the user performs on the portable terminal 400 a setting relating to the connection mode of each device connected to the input unit 101 and the output unit 105 (plurality of content reproduction devices 200 and plurality of speakers 300) of the AV receiver 100. The setting relating to the connection mode includes, for example, a presence of a connection of the speaker 300 to each channel, a speaker system configuration (e.g. 2-channel and 5-channel), a presence of a connection of each content reproduction device 200, a connection connector number of each content reproduction device 200, a type of each content reproduction device 200 (device type, such as player, PC, or video camera), the manufacturer of each content reproduction device 200, and a model name of each content reproduction device 200 (player model name, PC model name, and video camera model name).

As illustrated in FIG. 2, the AV receiver 100 is configured to implement each function of a sound pickup unit 11, a detection unit 12, a determination unit 13, and a communication unit 14. The portable terminal 400 is configured to implement each function of a communication unit 41, a control unit 42, an operation input unit 43, and a display unit 44. In FIG. 2, transmission and reception of information are represented as the solid lines, and transmission and reception of audio signals are represented as the dotted lines. As described above, transmission and reception of information between the AV receiver 100 and the portable terminal 400 are performed by wireless communication. The sound pickup unit 11, the detection unit 12, and the determination unit 13 are implemented by the input unit 101, the output unit 105, the CPU 103, and the DSP 102.

The sound pickup unit 11 is configured to output an audio signal of a test sound to each channel. A sound pickup signal from the microphone 107 is input to the sound pickup unit 11. The sound pickup unit 11 is configured to output, as a sound pickup result, a plurality of sound pickup signals corresponding to a plurality of channels to the detection unit 12.

The detection unit 12 is configured to detect whether or not the speaker 300 is connected to each channel based on the sound pickup result from the sound pickup unit 11. More specifically, when a level of the sound pickup signal for each channel is equal to or more than a predetermined threshold, the detection unit 12 detects that any one of the speakers 300 is connected to that channel. The detection unit 12 is configured to output information indicating whether or not the speaker 300 is connected to each channel as a detection result to the determination unit 13. This detection result corresponds to the actual connection mode of the plurality of speakers 300 connected to the AV receiver 100.

The detection unit 12 is also configured to detect whether or not any one of the content reproduction devices 200 is connected to each HDMI connector of the input unit 101. More specifically, the detection unit 12 transmits a detection signal conforming to an HDMI-Consumer Electronics Control (CEC) format from the HDMI connectors of the input unit 101. A detection result signal conforming to the HDMI-CEC format is input to the detection unit 12. The detection result signal includes, for example, information on the type and model name of the content reproduction device 200. The detection unit 12 is also configured to output the detection result indicated by the detection result signal to the determination unit 13. The detection result signal corresponds to the actual connection mode of the plurality of content reproduction devices 200 connected to the AV receiver 100.

The determination unit 13 is configured to determine a difference between the actual connection mode indicated by the detection result output by the detection unit 12 and the connection mode indicated by setting information acquired from the portable terminal 400. The setting information from the portable terminal 400 is input from the communication unit 14. The determination unit 13 is configured to output the determination result of the difference in connection modes to the communication unit 14. The determination result includes information indicating whether or not there is a difference in, for example, the presence of a connection of the speaker 300 to each channel, the speaker system configuration, and the presence of a connection of the content reproduction device 200 to each HDMI connector. The determination result also includes information indicating whether or not there is a difference in the connection connector number, the type, the manufacturer, the model name, etc., of each content reproduction device 200.

The communication unit 14 is configured to transmit the determination result from the determination unit 13 to the communication unit 41 of the portable terminal 400. The communication unit 14 is also configured to receive setting information from the communication unit 41 of the portable terminal 400.

The control unit 42 of the portable terminal 400 is configured to transmit, when the setting information on the connection mode of the devices (plurality of content reproduction devices 200 and plurality of speakers 300) connected to the input unit 101 and the output unit 105 of the AV receiver 100 is acquired from the operation input unit 43, the acquired setting information to the communication unit 14 of the AV receiver 100 via the communication unit 41. The control unit 42 is configured to cause the display unit 44 to perform, when the determination result of the determination unit 13 of the AV receiver 100 is acquired via the communication unit 41, a display that is based on that determination result.

But it is not necessary for the portable terminal 400 to include, in the own terminal, the program for implementing the display that is based on the operation input of the setting and the determination result. For example, the AV receiver 100 can be configured to acquire the operation input of the setting by causing, when the portable terminal 400 accesses the own terminal via a general-purpose WEB browser, the portable terminal 400 to execute a WEB application for inputting the setting. The AV receiver 100 also can be configured to cause the WEB application operated by the portable terminal 400 to execute a display that is based on a difference between the connection mode indicated by the setting information acquired via the WEB application and the detected actual connection mode.

The various function units of the AV receiver 100 and the portable terminal 400 are configured to operate in the following manner in order to perform connection confirmation processing that allows the user to confirm the connection mode of the devices connected to the AV receiver 100.

As illustrated in FIG. 3 (section(A)), when the operation input unit 43 of the portable terminal 400 receives from the user an operation input of a setting relating to the connection mode (S1), the control unit 42 causes the communication unit 41 to transmit that setting information (S3).

Then, as illustrated in FIG. 3 (section(B)), the communication unit 14 of the AV receiver 100 receives the setting information from the communication unit 41 (S11). The AV receiver 100 detects the presence of a connection for each of the plurality of speakers 300 (S12). More specifically, the sound pickup unit 11 outputs the audio signal of the test sound to each channel. When any one of the speakers 300 is connected to a corresponding channel, the sound pickup unit 11 picks up the test sound output by that speaker 300. When the level of each sound pickup signal is equal to or more than a predetermined threshold, the detection unit 12 detects that any one of the speakers 300 is connected to the channel corresponding to that sound pickup signal.

In Step S12, the detection unit 12 also detects each content reproduction device 200 connected in accordance with the HDMI standard. More specifically, the detection unit 12 outputs a detection signal conforming to the HDMI-CEC format from each HDMI connector. When any one of the content reproduction devices 200 is connected to an HDMI connector, and there is a response to the detection signal in the HDMI-CEC format, the detection unit 12 receives a detection result signal in the HDMI-CEC format from the content reproduction device 200. This enables the detection unit 12 to detect the connection mode, such as the presence of a connection of the content reproduction device 200 to each HDMI connector of the input unit 101, and the type, model name, etc., of the content reproduction devices 200 connected to the HDMI connectors of the input unit 101. The AV receiver 100 can perform the processing of Step S12 before the processing of Step S11.

Next, the determination unit 13 determines a difference between the actual connection mode indicated by the detection result acquired in Step S12 and the connection mode indicated by the setting information received in Step S11 (S13). Then, the communication unit 14 transmits information on the determination result of the determination unit 13 to the communication unit 41 (S14). The communication unit 41 of the portable terminal 400 receives the information on the determination result transmitted from the communication unit 14 (S3). Then, the control unit 42 causes the display unit 44 to perform a display that is based on the determination result (S4).

Figure 4A:
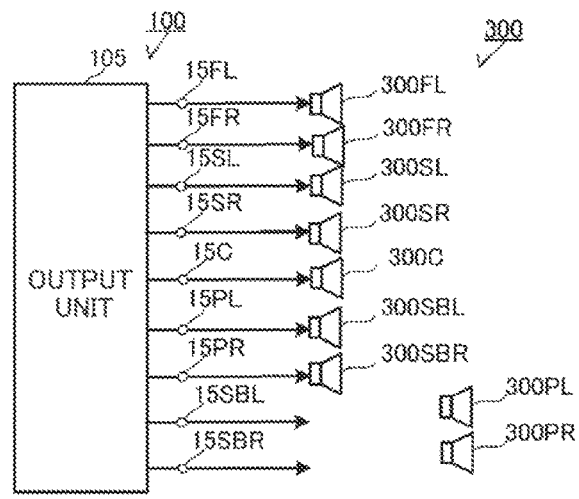
FIG. 4(A) is a diagram illustrating a connection between an output unit and each speaker to illustrate a connection example by a user.
Figure 4B:
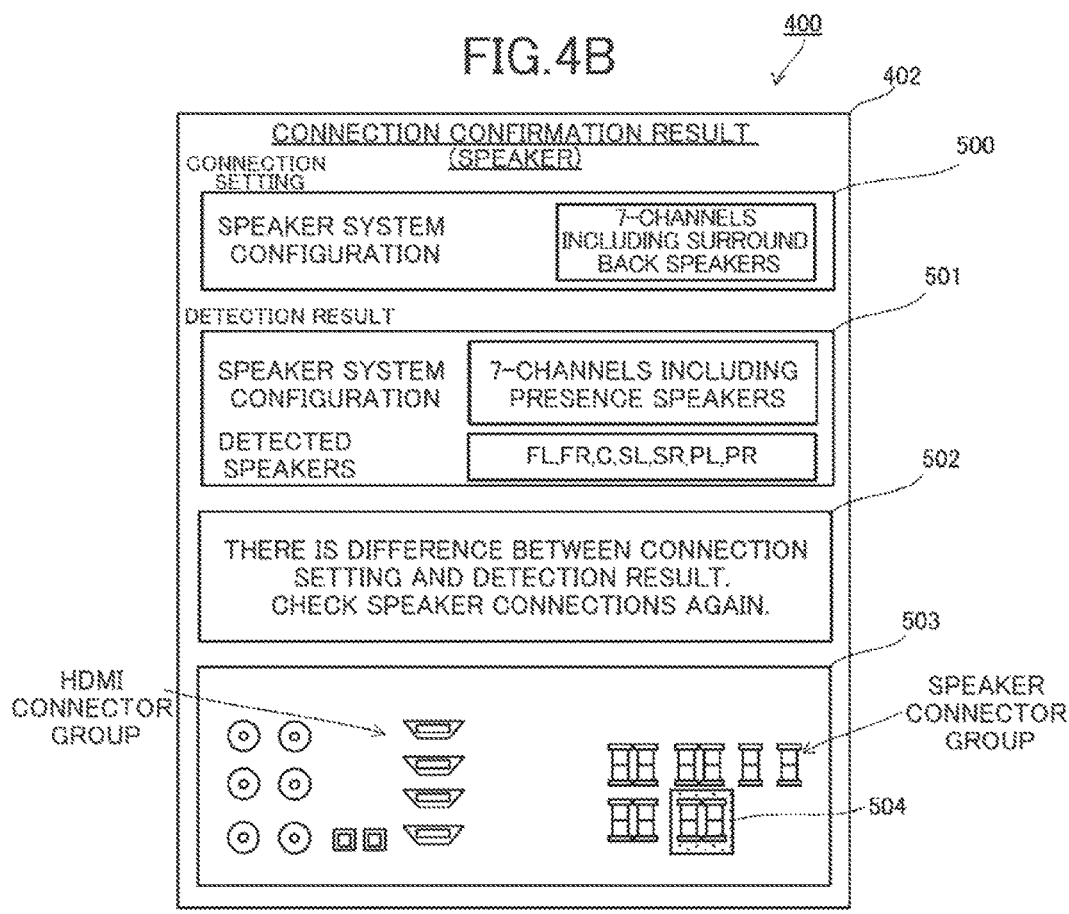
FIG. 4(B) is a display example of the portable terminal.

An example of the connection confirmation processing according to the first embodiment is described with reference to FIG. 4(A) and FIG. 4(B). FIG. 4(A) is a diagram for illustrating a connection between the output unit and each speaker in order to illustrate a connection example by the user. FIG. 4(B) is a diagram for illustrating a display example of the portable terminal.

In the connection example illustrated in FIG. 4(A), on the portable terminal 400, the user performs a connection setting in order to listen to seven channels (FL, FR, C, SL, SR, SBL, and SBR), including surround back speakers (S1).

In the connection example illustrated in FIG. 4(A), the speaker 300FL, the speaker 300FR, the speaker 300SL, the speaker 300SR, and the speaker 300C are each connected to a speaker connector 15 for the corresponding channel, but the speaker 300SBL for surround back is connected to a speaker connector 15PL for a presence speaker, and the speaker 300SBR for surround back is connected to a speaker connector 15PR for a presence speaker. The speaker 300PL and the speaker 300PR, which are presence speakers, are not connected to any of the speaker connectors 15. In other words, the connection example illustrated in FIG. 4(A) is an example where the user has made an error in the connections of the surround back speakers.

In the connection example illustrated in FIG. 4(A), the detection unit 12 detects that the speakers 300 are connected to the FL, FR, SL, SR, C, PL, and PR channels (S2). The detection unit 12 considers and detects the speakers 300 connected to the FL, FR, SL, SR, C, PL, and PR channels as respectively being the speaker 300FL, the speaker 300FR, the speaker 300SL, the speaker 300SR, the speaker 300C, the speaker 300PL, and the speaker 300PR. Therefore, the determination unit 13 determines that there is a difference between the connection mode indicated by the setting information (seven channels including surround back speakers) and the detected actual connection mode (seven channels including presence speakers) (S13).

As a result, as illustrated in FIG. 4(B), the connection setting shown in an area 500, the detection result (corresponding to the actual connection mode) shown in an area 501, a setting guidance message shown in an area 502, and a reference diagram shown in an area 503 are displayed as a connection confirmation result on the LCD 402 of the portable terminal 400 (S4). The reference diagram shown in the area 503 is a planar schematic diagram where various connector groups of the AV receiver 100 are arranged.

There is a difference between the connection mode indicated by the setting information and the actual connection mode indicated by the detection result, and hence the portable terminal 400 displays a message stating that there is a difference and that prompts the user to correct the connections, such as the setting guidance message shown in the area 502 (S4). The portable terminal 400 displays speaker connections that are different in a highlighted manner, as indicated by a highlighted area 504 (range shown in gray in FIG. 4(B)) in the area 503, and hence the user can easily understand the correct connection.

Thus, the connection confirmation system 900 is configured to display a difference between the connection mode indicated by the setting information and the actual connection mode indicated by the detection result. As a result, the user can confirm whether or not there is an error in the actual connection, and can set the connection mode to the desired connection mode.

The connection confirmation system 900 is not limited to the connection error illustrated in FIG. 4(A). The connection confirmation system 900 also allows the user to confirm whether or not he or she has forgotten a connection (e.g., when the number of detected channels is less than the number of set channels) or has made an extra connection (e.g., when the number of detected channels is more than the number of set channels) by performing on the portable terminal 400 a display that is based on a difference between the number of channels indicated by the setting information and the number of detected channels.

The user performs the connection setting on the portable terminal 400 displaying the GUI, and hence the connection confirmation system 900 allows the user to easily input the connection setting. Further, the portable terminal 400, which receives the operation input of the setting, implements the display, and hence the user can input the setting and confirm a difference in the connection mode on one portable terminal 400.

Figure 5A:
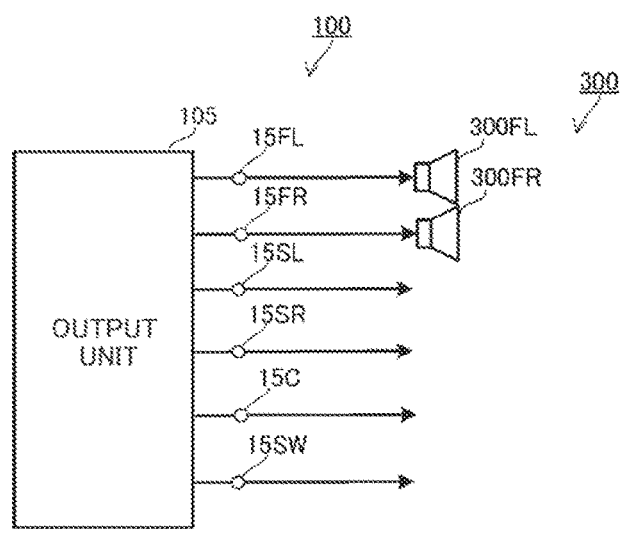
FIG. 5(A) is a diagram illustrating a connection between the output unit and each speaker to illustrate a connection example by the user.
Figure 5B:
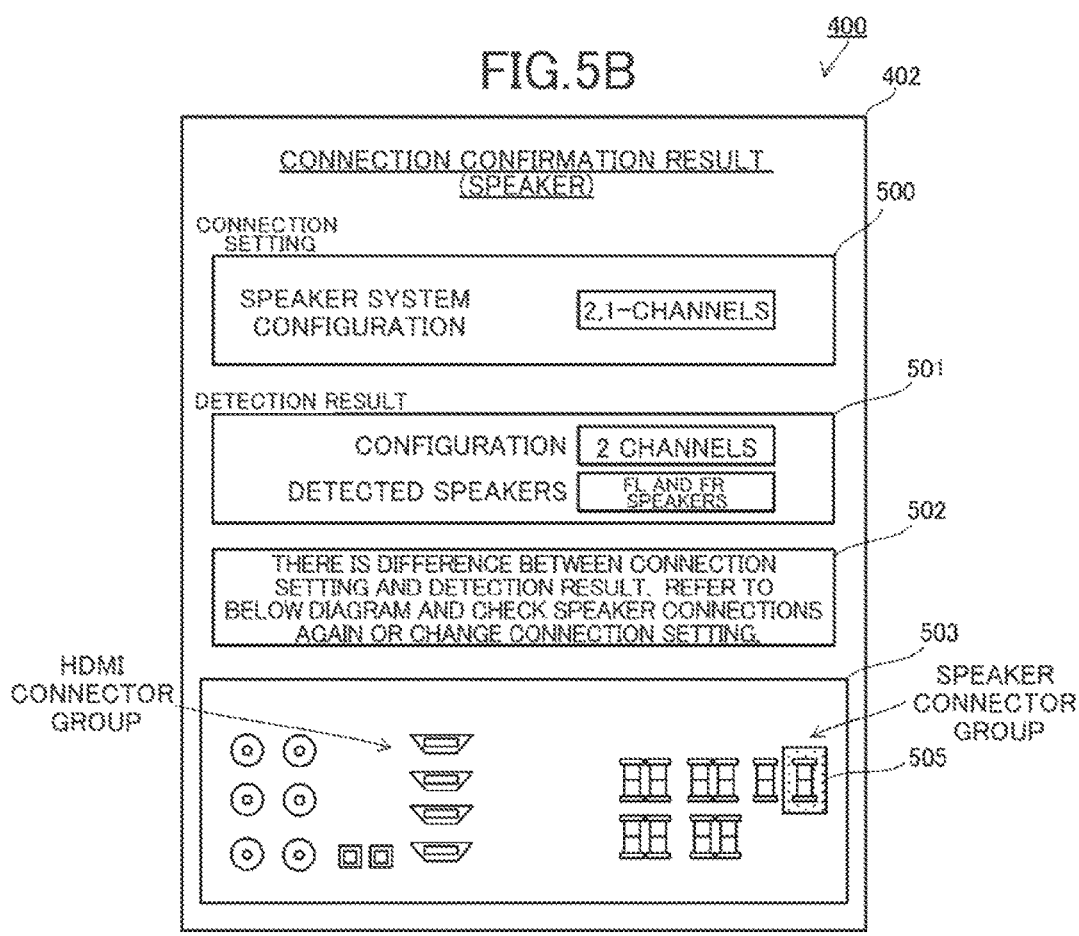
FIG. 5(B) is a display example of the portable terminal.

In the example illustrated in FIG. 4(A) and FIG. 4(B), there is an error by the user in the connection of the speakers 300. But there is now described a case where there is an error in the setting by the user. This case is described with reference to FIG. 5(A) and FIG. 5(B). FIG. 5(A) is a diagram for illustrating a connection between the output unit and each speaker in order to illustrate a connection example by the user. FIG. 5(B) is a diagram for illustrating a display example of the portable terminal.

In the connection example illustrated in FIG. 5(A), the user wants to use the speaker 300FL and the speaker 300FR in order to listen to two-channel stereo sound. In the connection example illustrated in FIG. 5(A), the speaker 300FL and the speaker 300FR are correctly connected to the speaker connector 15FL and the speaker connector 15FR, respectively. None of the speakers 300 is connected to a speaker connector 15SW for a subwoofer.

In the connection example illustrated in FIG. 5(A), however, on the portable terminal 400, the user sets 2.1 channel surround sound, which uses the speaker 300FL, the speaker 300FR, and a speaker 300SW, as the connection mode. In other words, in the example illustrated in FIG. 5(A) and FIG. 5(B), there is an error in the connection setting by the user.

In the connection example illustrated in FIG. 5(A), the detection unit 12 detects the actual speaker system configuration to be a two channel configuration, and considers and detects the speaker 300 connected to the FL channel to be the speaker 300FL and the speaker 300 connected to the FR channel to be the speaker 300FR. As a result, the determination unit 13 determines that there is a difference between the actual connection mode indicated by the detection result and the connection mode indicated by the setting information.

Therefore, as illustrated in FIG. 5(B), the portable terminal 400 displays in the area 502 a message stating that there is a difference and that prompts the user to correct the connections or to correct the setting. As a result, the user notices that there is an error in his or her own connection setting, and can set the connection mode to the desired connection mode by inputting a corrected setting.

In the examples described above, connection confirmation processing regarding the connection mode of each speaker 300 is performed. But the connection confirmation processing also can be performed regarding the connection mode of each content reproduction device 200.

Figure 6A:
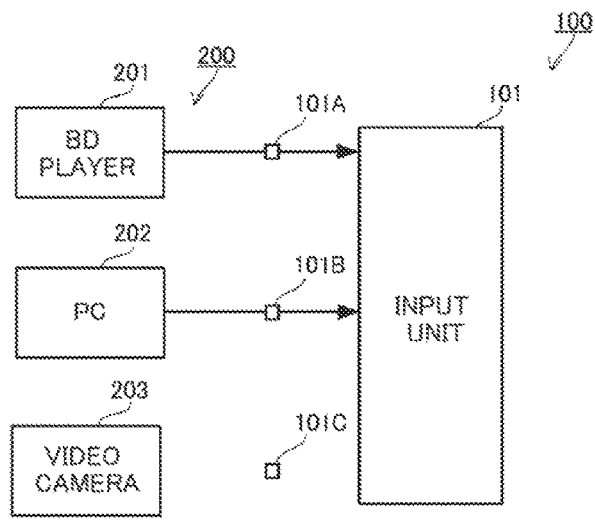
FIG. 6(A) is a diagram illustrating a connection between an input unit and each content reproduction device to illustrate a connection example by the user.
Figure 6B:
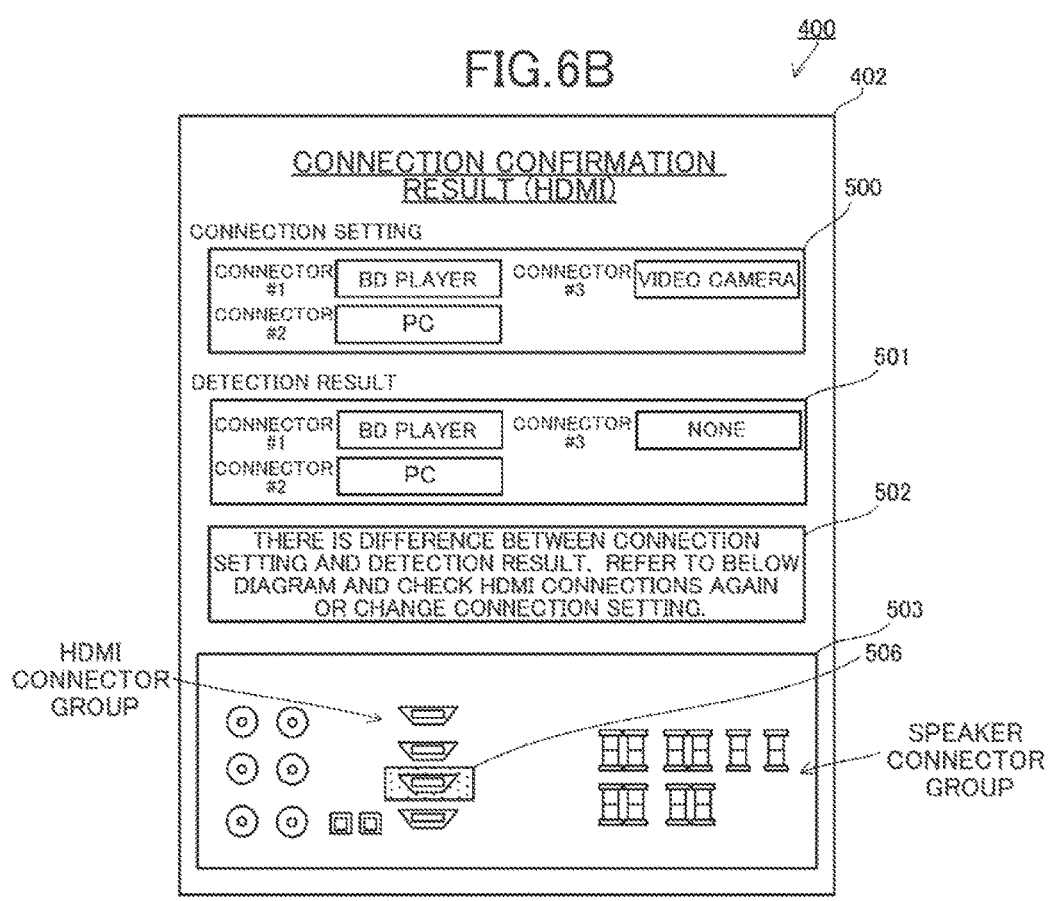
FIG. 6(B) is a display example of the portable terminal.

FIG. 6(A) is a diagram for illustrating a connection between the input unit and each content reproduction device in order to illustrate a connection example by the user. FIG. 6(B) is a diagram for illustrating a display example of the portable terminal.

In the connection example illustrated in FIG. 6(A), the user wants to listen to sound included in content in the BD player 201, the PC 202, and the video camera 203. In the connection example illustrated in FIG. 6(A), as the connection mode, the user sets in the portable terminal 400 that the BD player 201 is to be connected to an HDMI connector 101A (connector number 1), the PC 202 is to be connected to an HDMI connector 101B (connector number 2), and the video camera 203 is to be connected to an HDMI connector 101C (connector number 3).

In the connection example illustrated in FIG. 6(A), the BD player 201 is correctly connected to the HDMI connector 101A and the PC 202 is connected to the HDMI connector 101B, but the video camera 203 is not connected to any of the HDMI connectors. In other words, the connection example illustrated in FIG. 6(A) is an example where the user has forgotten to connect the video camera 203.

Therefore, a detection result signal in the HDMI-CEC format is returned from the BD player 201 and the PC 202, but is not returned from the video camera 203. As a result, the detection unit 12 detects that the BD player 201 is connected to the connector number 1, and the PC is connected to the connector number 2.

Based on this, the portable terminal 400 displays in the area 500 of the LCD 402 the connection mode indicated by the connection setting, and displays in the area 501 the actual connection mode indicated by the detection result. The portable terminal 400 also displays in the area 502 a message stating that, regarding the HDMI connections, there is a difference between the connection mode indicated by the setting information and the actual connection mode indicated by the detection result, and that prompts the user to correct the connections or the setting. In order to correct the connection error, the portable terminal 400 displays a reference diagram in the area 503, and as indicated by a highlighted area 506, displays the HDMI connector of a connector number 3, for which a connection error has been determined to exist, in a highlighted manner.

The AV receiver 100 is not limited to detecting the connection mode of connections that use a speaker cable or an HDMI cable. The AV receiver 100 also can be configured to detect the connection mode of connections based on wireless communication that does not use physical cables.

For example, the detection unit 12 can be configured to detect the presence of a connection, the type, etc., of the content reproduction device 200 connected by Bluetooth communication to the input unit 101 by determining a Bluetooth profile. The detection unit 12 also can be configured to detect the speakers 300 connected by Bluetooth communication to the output unit 105. The detection unit 12 is not limited to detecting connections by Bluetooth communication. The detection unit 12 also can be configured to detect devices connected by a wireless LAN.

The detection unit 12 is not limited to detecting devices that are directly connected to the AV receiver 100. The detection unit 12 can be configured to detect devices connected via a network. In other words, the detection unit 12 can detect devices that are logically connected to the AV receiver 100. For example, the detection unit 12 can be configured to detect, through polling, the presence of a connection, the type, etc., of the content reproduction devices 200 connected by a LAN to the input unit 101.

The function of the determination unit 13 can be implemented by the portable terminal 400. In other words, the portable terminal 400 can be configured to acquire the detection result from the detection unit 12 via the communication unit 41, and to determine, in the own terminal, whether or not there is a difference between the connection mode indicated by the setting information and the actual connection mode indicated by the detection result.

The connection confirmation system 900 is not limited to including the portable terminal 400 in order to receive the operation input of the setting by the user. The connection confirmation system 900 can be configured to receive the operation input of the setting by the user on a PC including a keyboard and a mouse. The connection confirmation system 900 also can be configured to receive an operation input by an apparatus that does not include a device unit, and only includes an operation receiving unit, such as a keyboard, and to perform the display that is based on the determination result by the AV receiver 100.

In the connection confirmation system 900, the connection detection apparatus is not limited to the AV receiver 100. The connection detection apparatus can be any apparatus, as long as that apparatus is capable of detecting devices connected to the own apparatus, and has a simple user interface. For example, as the connection detection apparatus, a built-in apparatus, such as a public address (PA) mixer, can be used.

Figure 7:
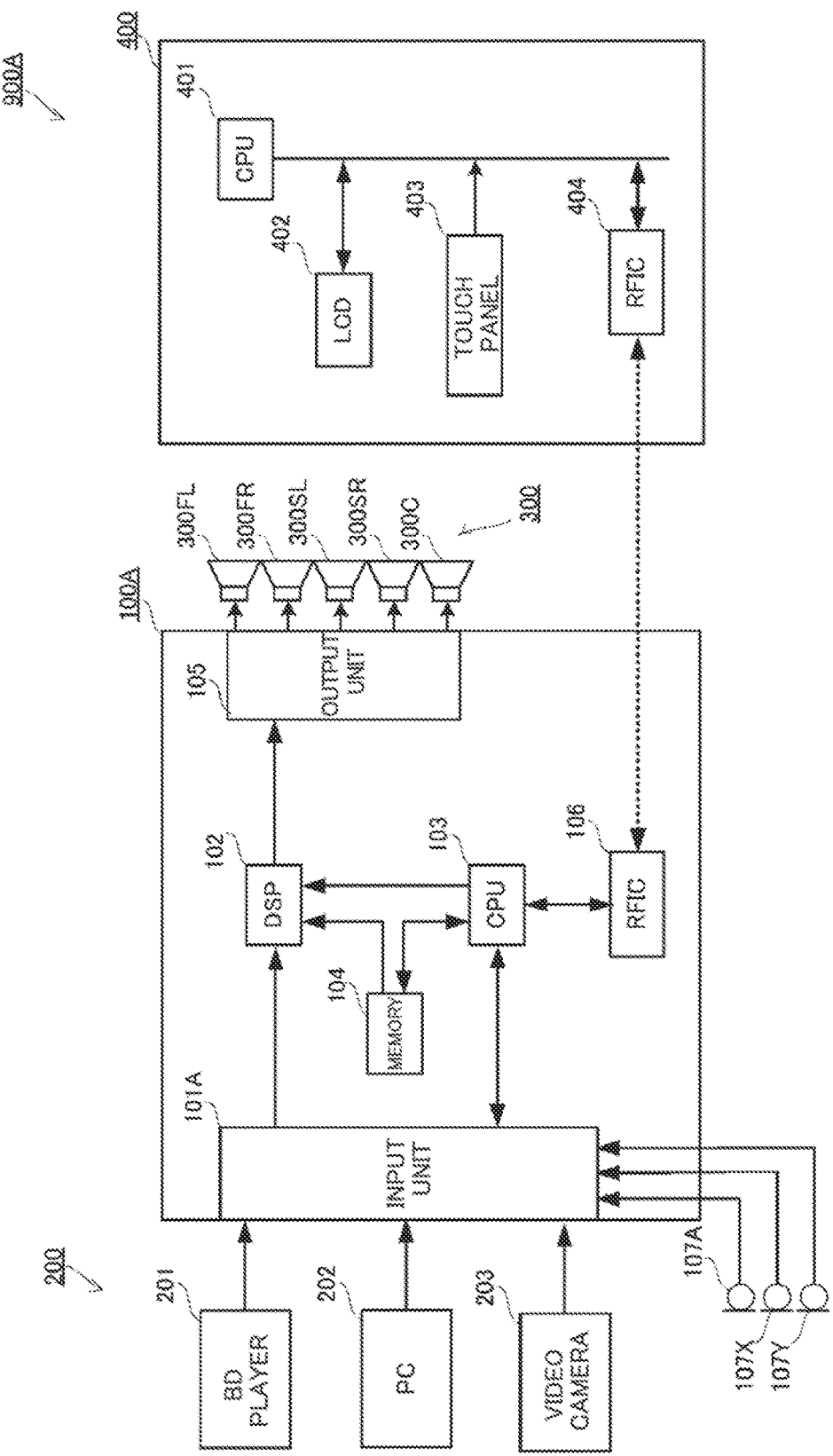
FIG. 7 is a block diagram illustrating a portion of a configuration of a connection confirmation system according to a second embodiment of the present invention.

Next, a connection confirmation system 900A according to a second embodiment of the present invention is described with reference to FIG. 7. FIG. 7 is a block diagram for illustrating a portion of the configuration of the connection confirmation system 900A.

The connection confirmation system 900A is different from the connection confirmation system 900 according to the first embodiment in the point that the position of each speaker 300 is included in the connection mode. More specifically, in the connection confirmation system 900A, the user can confirm whether or not there is an error in the arrangement of each speaker 300, and whether or not there is an error in the setting of the arrangement, and hence the user can set the arrangement of each speaker 300 to a desired arrangement. A description of configurations that are the same as those in the connection confirmation system 900 is omitted.

More specifically, the connection confirmation system 900A is different from the connection confirmation system 900 in the point that an AV receiver 100A includes a microphone 107A, a microphone 107X, and a microphone 107Y, the point that a sound pickup signal from each of the microphone 107A, the microphone 107X, and the microphone 107Y is input to an input unit 101A, and the point that a detection unit 12A is configured to detect the position of each speaker 300 based on each sound pickup signal. The connection confirmation system 900A is also different from the connection confirmation system 900 in the point that operation input of a setting relating to the position of each speaker 300 is performed on the portable terminal 400.

The microphone 107A, the microphone 107X, and the microphone 107Y (hereinafter collectively simply referred to as "microphones 107") are arranged close to each other. More specifically, the microphone 107X is arranged a predetermined distance d to the right of the microphone 107A, which is arranged at a listening position of the user. The microphone 107Y is arranged the predetermined distance d forward from the microphone 107A. In this case, the direction where the speaker 300FL and the speaker 300FR are to be arranged from the listening position is considered to be the forward direction.

The sound pickup signal from each of the microphones 107 is input to a sound pickup unit 11A of the AV receiver 100A. The detection unit 12A is configured to detect each sound source position (speaker position) by acquiring each sound pickup signal as a sound pickup result.

For example, the detection unit 12A calculates the position (XFL, YFL) of the speaker 300FL by using the following expressions based on the Pythagorean theorem. In the expressions, the X-axis represents the azimuth (corresponding to the right direction) from the position of the microphone 107A to the position of the microphone 107X, and the Y-axis represents the azimuth (corresponding to the forward direction) from the position of the microphone 107A to the position of the microphone 107Y.

$$XFL=(d2+r2A\_FL-r2X\_FL)/2d; \text{ and}$$

$$YFL=(d2+r2A\_FL-r2Y\_FL)/2d$$

In the above expressions, the distance d represents the distance between each of the microphones 107. A distance rA_FL represents the distance between the position of the speaker 300FL and the position of the microphone 107A. The distance rA_FL is calculated based on the speed of sound and the time taken from output of the test sound until the sound is directly detected in an impulse response included in the sound pickup signal of the microphone 107A. Similarly, a distance rX_FL represents the distance between the position of the speaker 300FL and the position of the microphone 107X, and a distance rY_FL represents the distance between the position of the speaker 300FL and the position of the microphone 107Y.

The detection unit 12A similarly detects the position (XFR, YFR) of the speaker 300FR by using the sound pickup signal received when a test sound is output by the sound pickup unit 11A from the speaker 300FR. The detection unit 12A also detects in the same manner the position of each speaker 300 connected to other channels.

Figure 8A:
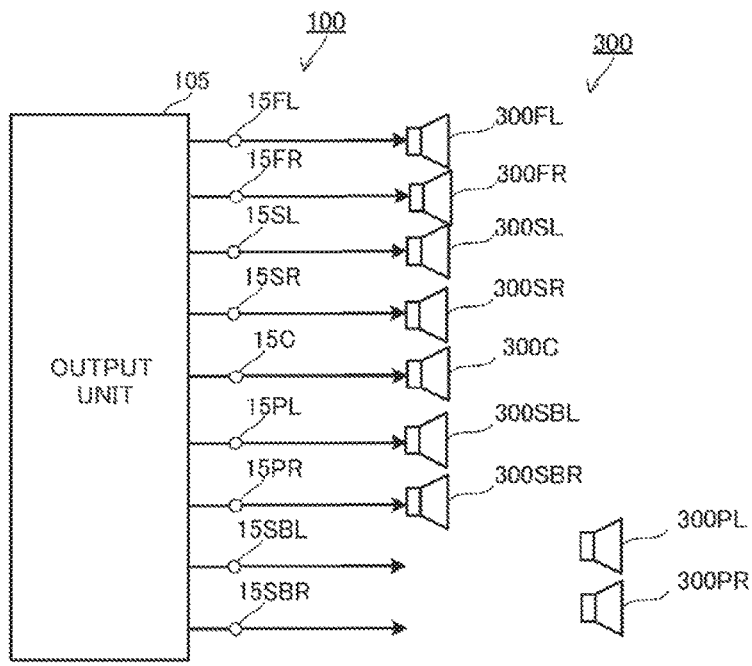
FIG. 8(A) is a diagram illustrating a connection between the output unit and each speaker to illustrate a speaker arrangement.
Figure 8B:
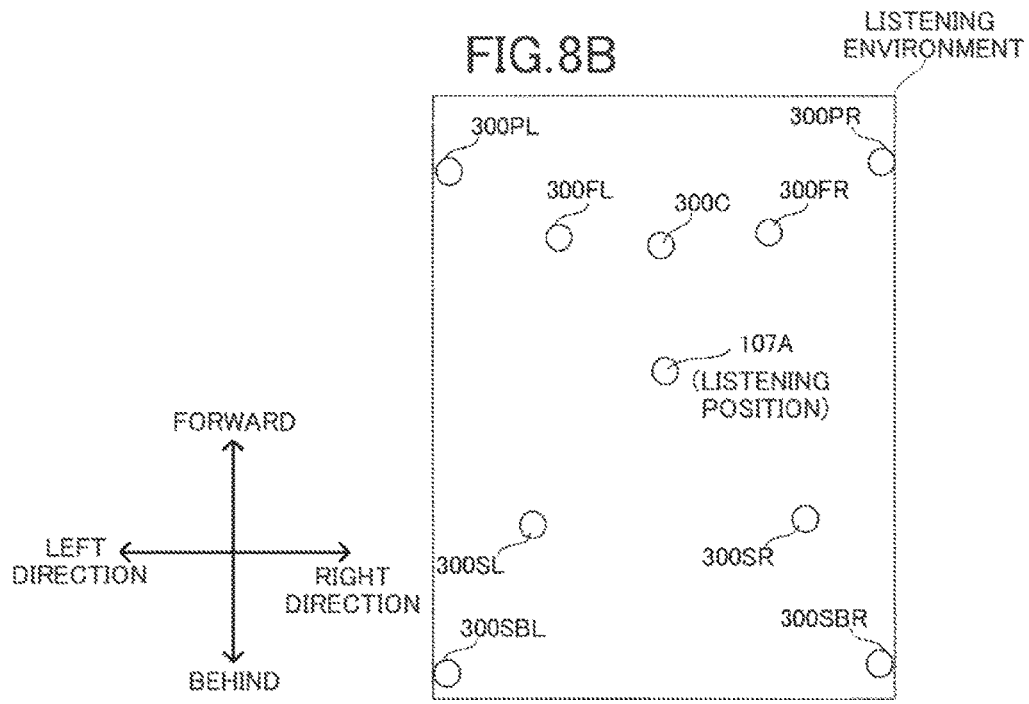
FIG. 8(B) is a plan schematic view of a listening environment illustrating the arrangement of each speaker in the listening environment.
Figure 9:
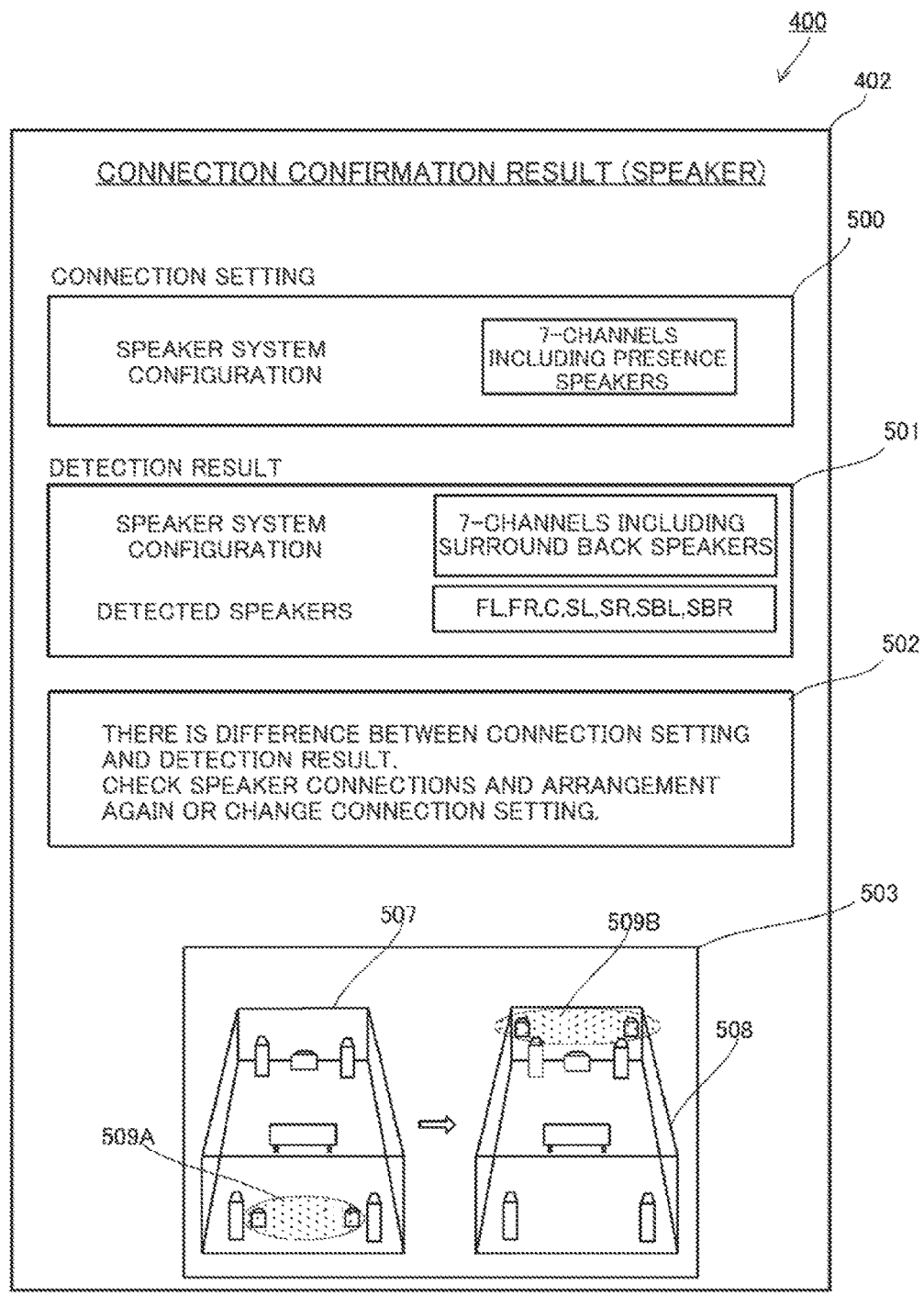
FIG. 9 is a diagram illustrating a display example of the portable terminal.

Next, an example of connection confirmation processing by the connection confirmation system 900A is described with reference to FIG. 8(A), FIG. 8(B), and FIG. 9. FIG. 8(A) is a diagram for illustrating a connection between the output unit and each speaker in order to illustrate a speaker arrangement, and FIG. 8(B) is a plan schematic view of a listening environment in order to illustrate the arrangement of each speaker in the listening environment. FIG. 9 is a diagram for illustrating a display example of the portable terminal.

In the connection example illustrated in FIG. 8(A), the user has arranged each speaker 300 around the listening environment as illustrated in FIG. 8(B) in order to listen to seven channels (FL, FR, C, SL, SR, PL, and PR), including presence speakers. In the example illustrated in FIG. 8(B), the speaker 300PL and the speaker 300PR, which are presence speakers, are arranged forward of the listening position, and the speaker 300SBL and the speaker 300SBR, which are surround back speakers, are arranged behind the listening position.

In the connection example illustrated in FIG. 8(A), the speaker 300SBL and the speaker 300SBR are erroneously connected to the speaker connector 15PL and the speaker connector 15PR, which are for presence speakers. The speaker 300PL and the speaker 300PR, which are presence speakers, are not connected to any of the speaker connectors.

In the connection example illustrated in FIG. 8(A), the detection unit 12 considers and detects the speaker 300SBL connected to the speaker connector 15PL of the PL channel and the speaker 300SBR connected to the speaker connector 15PR of the PR channel as being arranged behind the listening position. Therefore, the determination unit 13 determines that there is a difference between the connection mode indicated by the setting information (i.e., that a presence speaker is to be arranged forward of the listening position) and the detected actual connection mode (i.e., that a presence speaker is to be arranged behind the listening position).

Therefore, as illustrated in the display example of FIG. 9, the portable terminal 400 displays in the area 502 of the LCD 402 a message stating, for example, that there is a difference between the connection mode indicated by the setting information and the actual connection mode indicated by the detection result regarding the speaker arrangement. As a result, the user notices that there is an error in the speaker arrangement, and can set the connection mode for the speaker arrangement to the desired connection mode.

The portable terminal 400 displays, as the reference diagram to be shown in the area 503 of FIG. 9, the actual arrangement of each speaker 300 based on the detection result in an area 507, and the arrangement of each speaker 300 based on the setting information in an area 508. The portable terminal 400 also displays differences between the set arrangement and the actual arrangement of each speaker 300 in a highlighted area 509A and a highlighted area 509B. The arrangement of each speaker 300 is displayed by the portable terminal 400 in the form of a diagram, and hence the user can intuitively understand whether or not there is an error in the arrangement setting or an error in the actual arrangement.

In the above-mentioned examples, the AV receiver 100 and the AV receiver 100A are configured to perform connection confirmation processing regarding the connection mode of devices directly connected to the own receiver and the AV receiver 100A. But as described below, the AV receiver 100 and the AV receiver 100A also can be configured to perform connection confirmation processing regarding devices indirectly connected to the own receiver and the AV receiver 100A.

Figure 10:
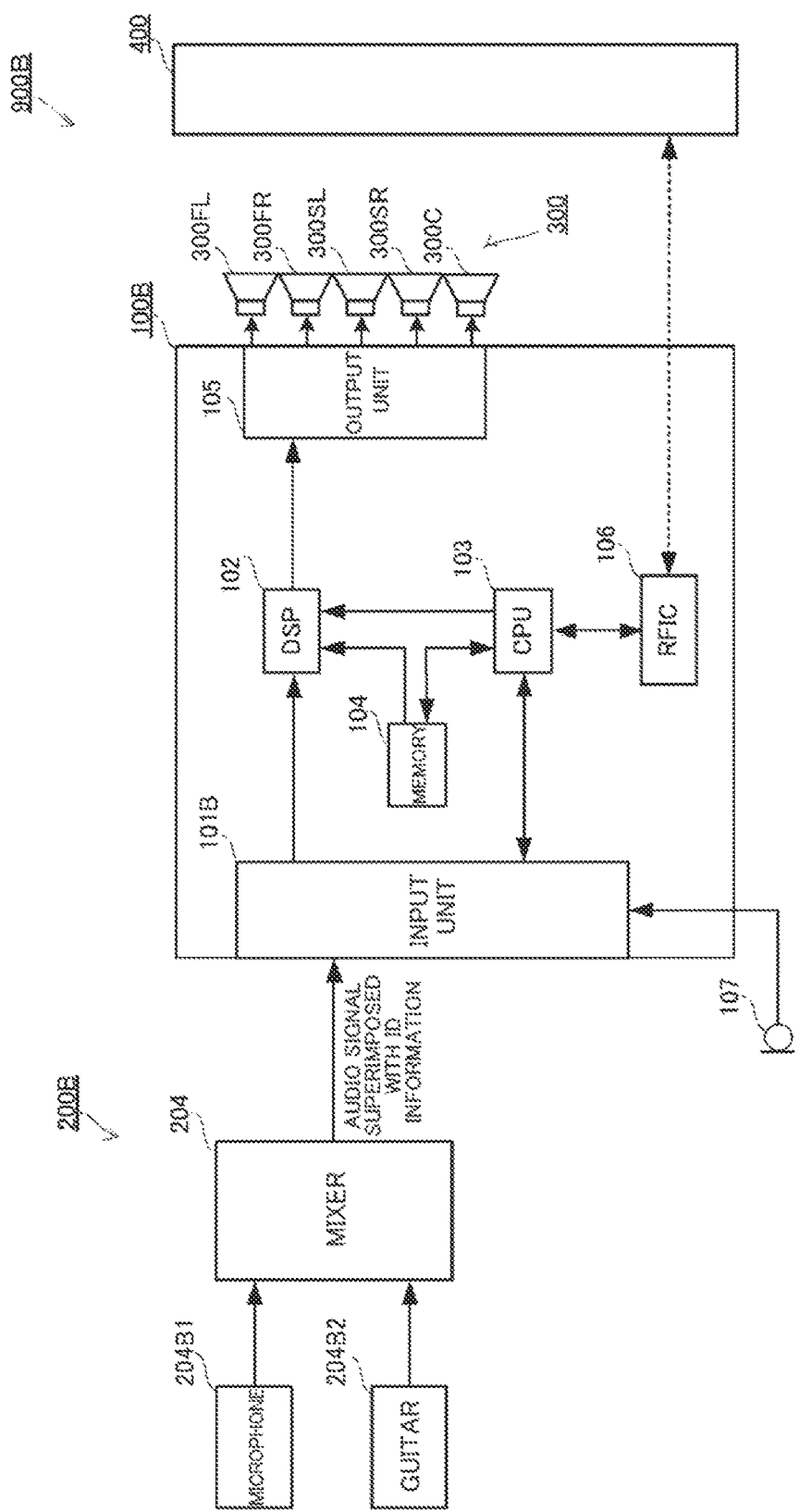
FIG. 10 is a block diagram illustrating a portion of a configuration of a connection confirmation system according to a third embodiment of the present invention.
Figure 11:
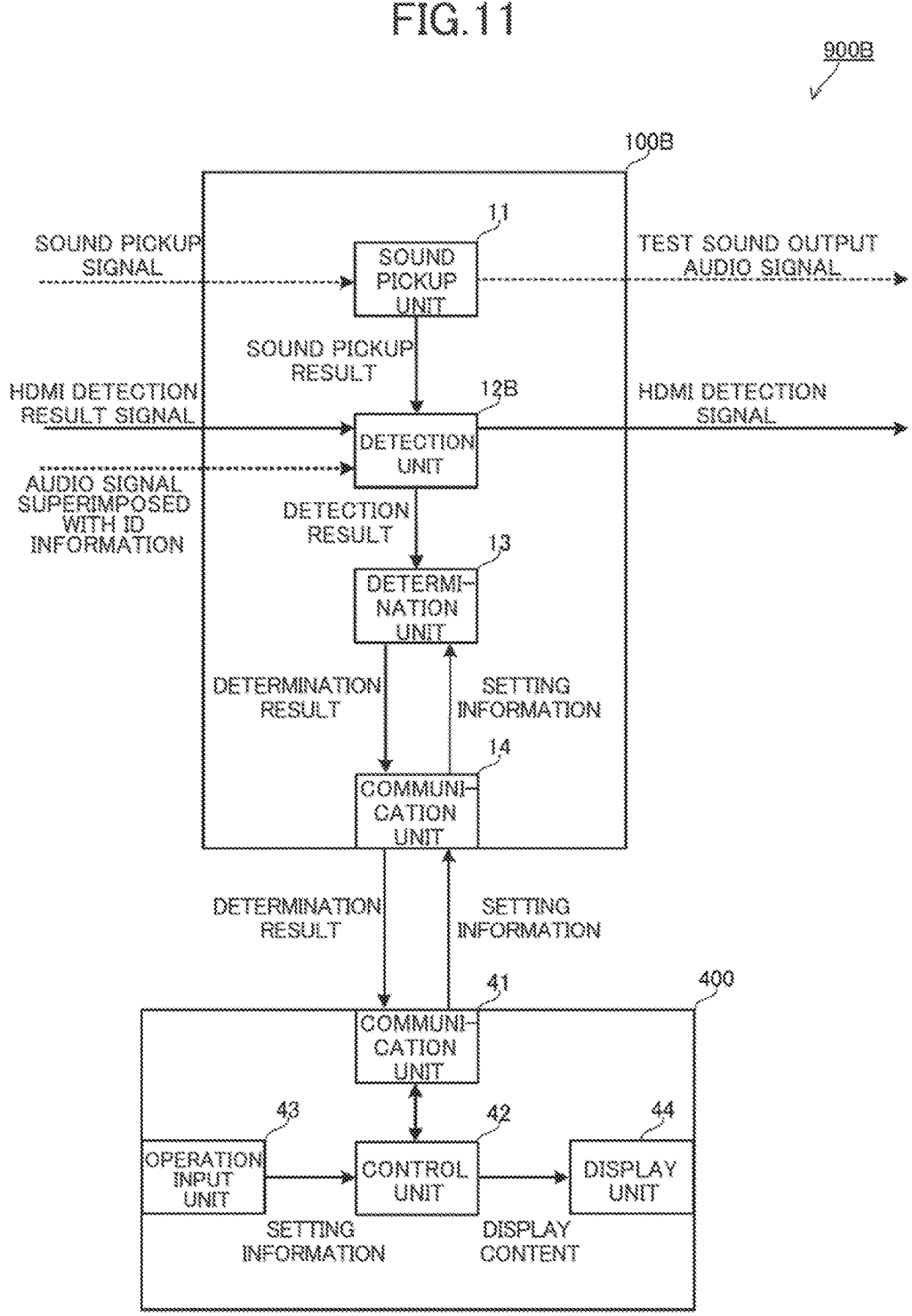
FIG. 11 is a function block diagram of an AV receiver and a portable terminal according to the third embodiment.

FIG. 10 is a block diagram for illustrating a portion of the configuration of the connection confirmation system according to a third embodiment of the present invention. FIG. 11 is a function block diagram of the AV receiver and the portable terminal according to the third embodiment. A connection confirmation system 900B according to the third embodiment is configured to determine a difference between the setting information from the user and the actual connection mode indicated by the detection result regarding the connection mode of devices (microphone 204B1 and guitar 204B2) indirectly connected via a mixer 204, and to perform a display that is based on that difference by the portable terminal 400.

The mixer 204 is connected to an input unit 101B of an AV receiver 100B by an audio cable. The microphone 204B1 and the guitar 204B2 are each connected to the mixer 204 by an audio cable. The microphone 204B1 is configured to superimpose identification (ID) information unique to the device on an audio signal generated by picking up sound, and to output the superimposed audio signal to the mixer 204. The guitar 204B2 is configured to generate musical sound based on an operation by the user, to superimpose ID information unique to the device on an audio signal of the musical sound, and to output the superimposed audio signal to the mixer 204.

The mixer 204 is configured to extract the ID information from each input audio signal. The mixer 204 is also configured to mix together each of the input audio signals, and to superimpose on the resultant mixed audio signal an information pair including the extracted ID information and ID information on the own mixer so that the own mixer is understood as being a parent device (and the microphone 204B1 and the guitar 204B2 are considered as being child devices). As a result, a parent-child relation of the connections between the devices is included in the superimposed information. It is desired that the information be superimposed on the audio signal in a higher bandwidth than the bandwidth normally used for audio signals (e.g., in a bandwidth of 20 kHz or more).

As illustrated in FIG. 11, the audio signal superimposed with the plurality of pieces of ID information is input to a detection unit 12B of the AV receiver 100B. The detection unit 12B is configured to extract the plurality of pieces of ID information from the input audio signal. The input audio signal also includes information indicating the parent-child relation of the connections, and hence the detection unit 12B detects that the microphone 204B1 and the guitar 204B2 are connected to the mixer 204.

As a result, the portable terminal 400 can perform a display that is based on a difference between the connection mode of the devices connected to the mixer 204 input by the user to the portable terminal 400 and the actual connection mode of the mixer 204 detected by the detection unit 12B.

The connection confirmation system 900B is not limited to one mixer 204 being connected to the input unit 101B of the AV receiver 100B. A plurality of mixers 204 can be connected in multiple stages. Even for complicated cabling where a plurality of mixers 204 are connected in multiple stages, the connection confirmation system 900B performs a display that is based on a difference between the connection mode indicated by the setting information by the user and the detected actual connection mode, and hence the connection confirmation system 900B allows the user to notice whether or not there is an error in the setting or in the connections.

Figure 12:
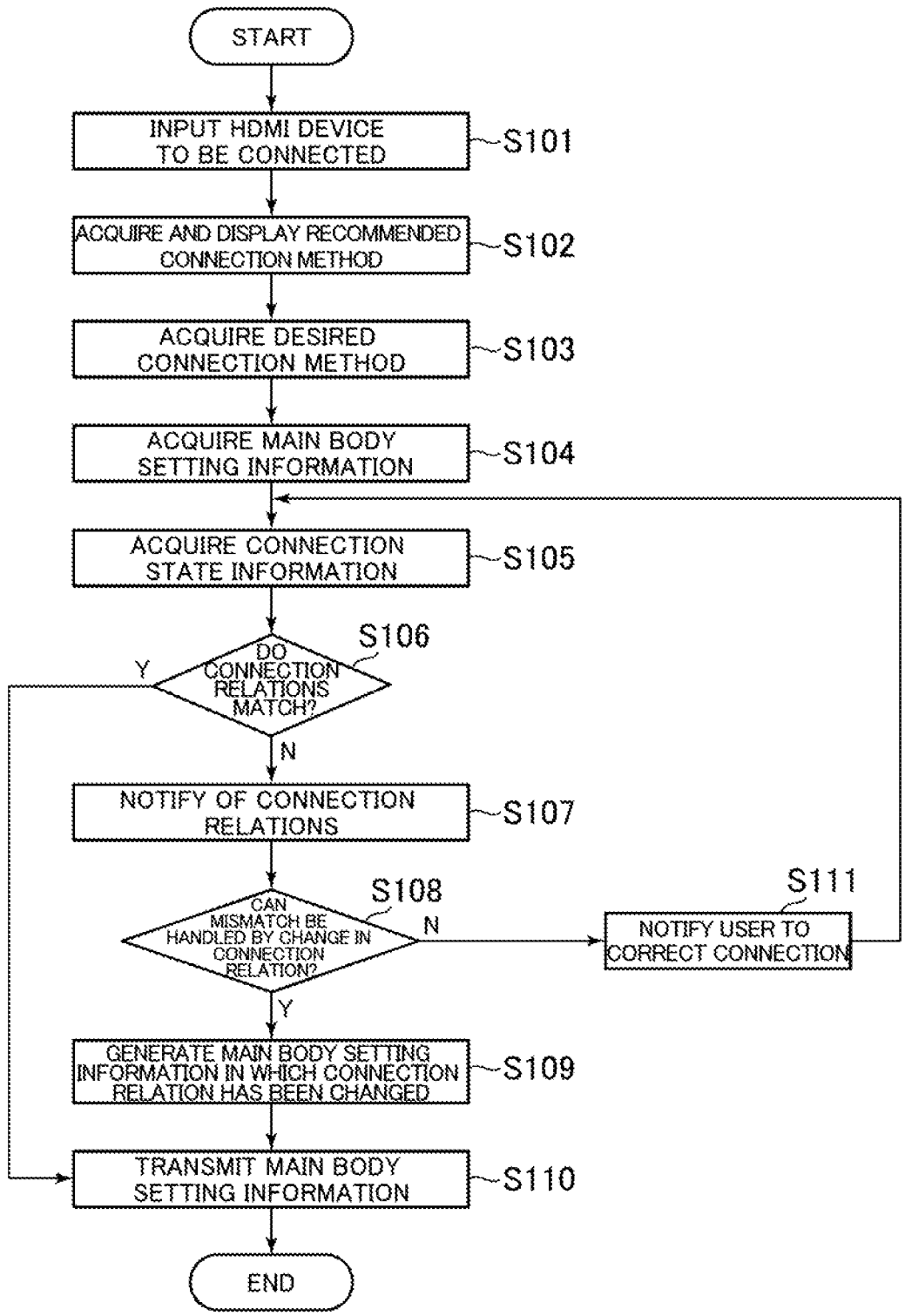
FIG. 12 is a flowchart for illustrating a first modified example of the first embodiment.

Next, a first modified example of the first embodiment is described. FIG. 12 is a diagram for illustrating the first modified example. Specifically, an outline of a processing flow by the portable terminal in the first modified example is illustrated in FIG. 12. In order to facilitate understanding, in the following description, there is described an example where the AV receiver 100 includes AV1 to AV7 as HDMI inputs, and HDMI OUT1 and HDMI OUT2 as HDMI outputs. In this example, the devices that the user wants to connect are a BD player, a set-top box (STB), and a television (TV) monitor. The flow outline described below is an example. This modified example is not limited to the following flow outline.

As illustrated in FIG. 12, the user inputs the HDMI device(s) that he/she wants to connect on a setting screen of the portable terminal 400 where a setting assistance application has been installed (S101). In this example, the user wants to connect the BD player, the STB, and the TV monitor as HDMI inputs, for example, and hence the user inputs the device IDs for identifying those devices by using the operation input unit 43 of the portable terminal 400. In this modified example, as an example, there is described a case where the setting assistance application has been installed in the portable terminal 400, but this modified example is not limited to such a case. The setting assistance application can be installed and used on another device.

The portable terminal 400 acquires a recommended connection method (recommended connection information) based on the input device(s) (e.g., based on the device ID(s)), and displays the acquired recommended connection method on the display unit 44 (S102). Specifically, for example, the recommended connection method is information indicating recommending that an HDMI terminal be used for the connection of the device(s). The recommended connection method corresponds to information where the user has associated a connection with each desired device in advance. More specifically, in the above-mentioned example, as shown in FIG. 13, when a recommended connection method where AV1 is connected to the BD player, AV3 is connected to the STB, and HDMI OUT1 is connected to the TV monitor is registered, the portable terminal 400 acquires recommended connection information indicating that the BD player 201 is to be connected to AV1, the STB is to be connected to AV3, and the TV monitor is to be connected to HDMI OUT1, and displays the acquired recommended connection information on the screen of the portable terminal 400.

The recommended connection information shown in FIG. 13 is an example, and the recommended connection information is not limited to that example. The recommended connection information can be acquired by another method, such as by determining the recommended connection information based on a combination of the HDMI devices to be connected. The user inputs a desired connection method while referring to the connection method displayed in Step S102, and the portable terminal 400 acquires information (desired connection information) indicating that desired connection method (S103). Similar to the recommended connection information shown in FIG. 13, the desired connection method corresponds to, for example, information where the device ID(s) and the HDMI terminal(s) are associated with one another. In this modified example, there is described a case where the recommended connection method matches the desired connection method. The recommended connection method, however, can be changed by the user. Then, the user connects the device(s) to the main body while referring to the displayed connection method.

The portable terminal 400 acquires main body setting information on the setting of the AV receiver 100 based on the desired connection information (S104). In this case, the main body setting information is, for example, information indicating the setting regarding the connection mode, and corresponds to information where an input terminal, an output terminal, etc., are associated with each device. In this modified example, for example, there is described an example where the two pieces of main body setting information (SCENE 1 and SCENE 2) illustrated in FIG. 14 are acquired. In this modified example, the main body setting information also can include information indicating various settings, such as an input setting, an HDMI output setting, a reproduction mode setting, an audio setting such as tone control, a sound field setting in accordance with each piece of video content, and a video setting such as a video mode.

The portable terminal 400 acquires connection state information acquired by the AV receiver 100 indicating a connection state between each terminal of the AV receiver 100 and each HDMI device (S105). Specifically, the connection state information corresponds to information indicating, for example, the fact that the BD player is connected to HDMI input: AV1. Detection of the connection state is performed by the AV receiver 100 using HDMI Extended Display Identification Data (EDID)/CEC. The connection state information also can be acquired based on an instruction from the portable terminal 400.

The portable terminal 400 judges whether or not the connection relation between each HDMI terminal and each HDMI device indicated by the main body setting information acquired in Step S104 and the connection relation between each HDMI terminal and each HDMI device indicated by the connection state information match (S106). This judgment is performed by, for example, the control unit 42 of the portable terminal 400. Specifically, for example, as shown in FIG. 13, when the main body setting information indicates the connection relation HDMI terminal: AV1 for the BD player, the portable terminal 400 judges that there is a match when the connection state information indicates that the BD player is connected to HDMI terminal: AV1.

When it is judged that the connection relations do not match, the portable terminal 400 notifies the user of mismatch connection relation information indicating that the connection relations do not match (S107). Specifically, for example, in the above-mentioned example, when the user connected the BD player to HDMI input: AV1, but erroneously connected the STB to HDMI input: AV5 and the TV monitor to HDMI output: HDMI OUT2, this means that an input is missing because, in the main body setting information, the connection destination of the STB is, as shown in SCENE 2, HDMI input: AV3. Similarly, an output is missing because the connection destination of the TV monitor is HDMI OUT1. In this case, the mismatch connection relation information contains, for example, information indicating that the STB is connected to HDMI input: AV5 in place of HDMI input: AV3. The notification corresponds to, for example, the display on the display unit 44 of the information indicating the mismatch connection relation information.

Next, the control unit 42 of the portable terminal 400 judges whether or not the mismatch in connection relations can be handled by changing the connection relation indicated by the main body setting information based on the connection state information, namely, whether or not the connection relation is changeable in accordance with the connection state information (S108). For example, in the above-mentioned example, the mismatch can be handled when the HDMI output is changed from HDMI output: HDMI OUT1 to HDMI output: HDMI OUT2 in the main body setting information of SCENE 2, and hence the control unit 42 of the portable terminal 400 judges that the mismatch can be handled. On the other hand, for example, when the user has erroneously connected the TV monitor to HDMI input: AV2, the input and the output are different, and hence the control unit 42 of the portable terminal 400 judges that the mismatch cannot be handled because the mismatch cannot be handled by a change in the main body setting information. The judgment regarding whether or not the mismatch can be handled as described herein is an example, and can be performed in some other manner. A judgment result (e.g., a display on the display unit 44 indicating that the mismatch can be handled by a change in the main body setting information) can be notified to the user. The above-mentioned judgment is performed by, for example, the control unit 42 of the portable terminal 400.

When it is judged that the mismatch can be handled, main body setting information is generated where the connection relation indicated by the main body setting information has been changed (S109). Specifically, for example, in the above-mentioned example, main body setting information is generated where the HDMI output in the main body setting information of SCENE 2 has been changed from HDMI output: HDMI OUT1 to HDMI output: HDMI OUT2. The main body setting information is generated by, for example, the control unit 42.

The portable terminal 400 transmits the main body setting information to the AV receiver 100 (5110). Specifically, the portable terminal 400 transmits, when it is judged in Step S106 that the connection relations match, the main body setting information acquired in Step S104 to the AV receiver 100 via the communication unit 41, or transmits the main body setting information generated in Step S109 to the AV receiver 100. The AV receiver 100 reflects the received main body setting information in the original main body setting information, and then ends the processing. The transmission performed in this step is performed via, for example, the communication unit 41.

On the other hand, when it is judged in Step S108 that the mismatch cannot be handled, the user is notified to correct the connection (S111). Specifically, for example, a message stating "Please correct the connection" is displayed on the display unit 44. The above-mentioned mismatch connection information also can be displayed. As a result of this processing, the user can correct the connection while referring to the mismatch connection information. The processing then returns to Step S105, and the portable terminal 400 again judges whether or not the connection relations match, for example.

The above-mentioned first modified example is an example. The components in the first modified example can be replaced with components that are essentially the same or with components that provide essentially the same operation and effect.

For example, in the first modified example, there is described a case where the processing etc. in Steps S106 and S108 is performed on the portable terminal 400 side. But as described in the following second modified example, the processing can be performed on the AV receiver 100 side. Specifically, such a case is now described with respect to FIG. 15 and FIG. 16.

Figure 15:
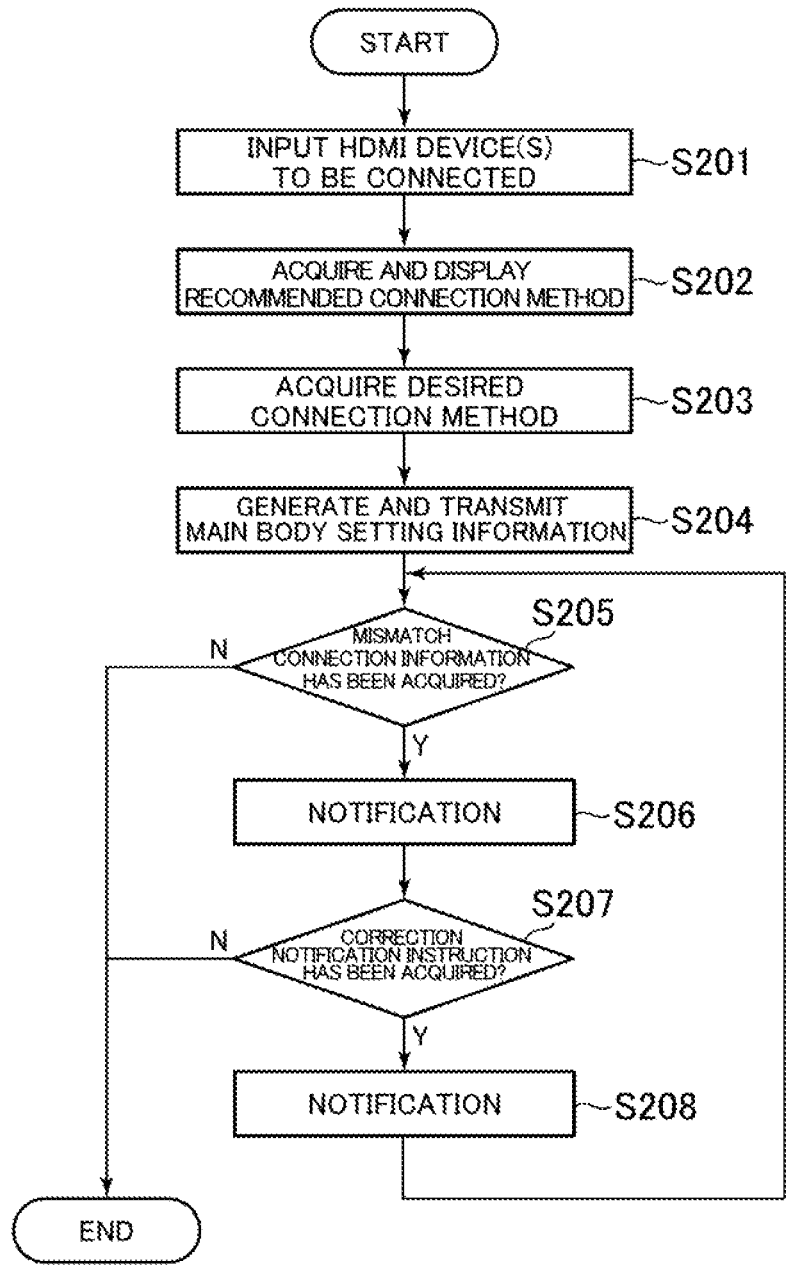
FIG. 15 is a flowchart illustrating a second modified example of the first embodiment.
Figure 16:
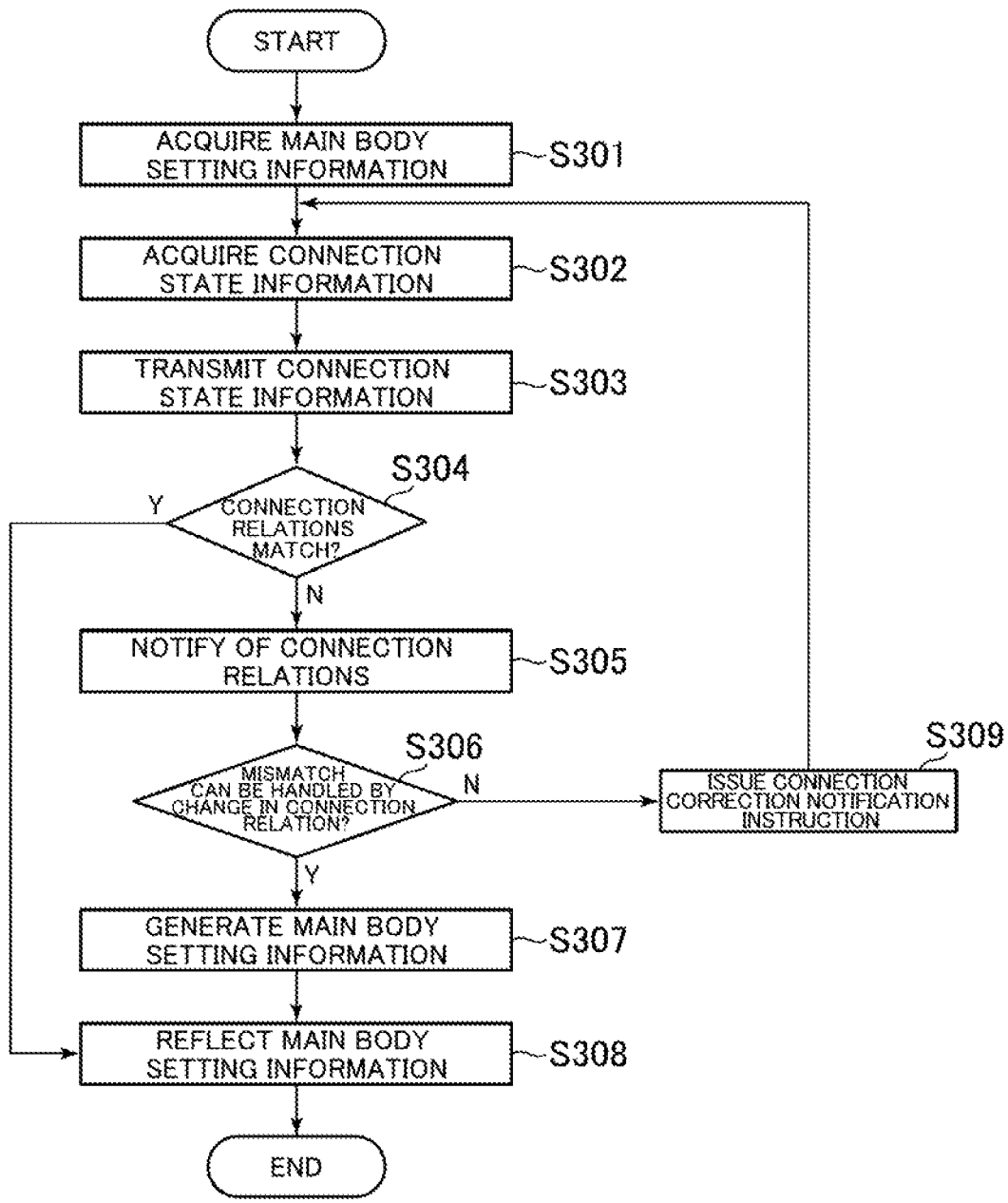
FIG. 16 is a flowchart illustrating the second modified example of the first embodiment.

FIG. 15 and FIG. 16 are diagrams for illustrating a second modified example of the first embodiment. An outline of a processing flow by the portable terminal in the second modified example is illustrated in FIG. 15, and an outline of a processing flow by the AV receiver in the second modified example is illustrated in FIG. 16. In the following second modified example, description of processing etc. that is the same as in the first modified example is omitted.

As illustrated in FIG. 15, on the setting screen of the setting assistance application of the portable terminal 400, the user inputs the HDMI device(s) that he/she wants to connect (S201). The portable terminal 400 acquires the recommended connection method (recommended connection information) based on the input HDMI device(s), and displays the acquired recommended connection method on the screen (S202).

The user inputs the connection method desired by the user while referring to the connection method displayed in Step S202, and the portable terminal 400 acquires information indicating that desired connection method (desired connection information) (S203). Then, the user connects the HDMI device(s) to the AV receiver 100 while referring to the displayed connection method.

The portable terminal 400 generates main body setting information based on the acquired connection information, and transmits the generated main body setting information to the AV receiver 100 (S204). The portable terminal 400 then judges whether or not the mismatch connection information has been acquired from the AV receiver 100 (S205). The judgment is performed by, for example, the control unit 42. When it is judged that the mismatch connection information has been acquired, the portable terminal 400 notifies the user of the mismatch connection information (S206). On the other hand, when it is judged that the mismatch connection information has not been acquired, the portable terminal 400 ends the processing. Specifically, the portable terminal 400 judges that the mismatch connection information has not been acquired when, for example, the mismatch connection information has not been acquired within a predetermined period after the transmission of the main body setting information in Step S204.

The portable terminal 400 judges whether or not a correction notification instruction has been acquired from the AV receiver 100 (S207). When it is judged that the correction notification instruction has been acquired, the portable terminal 400 notifies the user to correct the connection (S208), and the processing returns to Step S205. As described above, the notification corresponds to, for example, displaying a message such as "Please correct the connection" on the display unit 44. On the other hand, when it is judged that the correction notification instruction has not been acquired, the portable terminal 400 ends the processing. The portable terminal 400 judges that the correction notification instruction has not been acquired when, for example, the correction notification instruction has not been acquired from the AV receiver 100 within a predetermined period after acquisition of the mismatch connection information in Step S205.

Next, an outline of the processing flow by the AV receiver 100 in this modified example is described with reference to FIG. 16. The flow outline described below is an example. This modified example is not limited to the following flow outline.

The AV receiver 100 acquires the main body setting information (S301). The AV receiver 100 then acquires the connection state information indicating the connection state between the HDMI device(s) and the HDMI terminal(s) of the AV receiver 100 (S302).

The AV receiver 100 transmits the acquired connection state information to the portable terminal 400 (S303). The AV receiver 100 then judges whether or not the connection relation between the HDMI terminal(s) and the HDMI device(s) indicated by the main body setting information acquired in Step S301 and the connection relation between the HDMI terminal(s) and the HDMI device(s) indicated by the connection state information match (S304).

When it is judged that the connection relations do not match, the AV receiver 100 transmits the non-matching connection relations (mismatch connection information) to the portable terminal 400 (S305). The AV receiver 100 then judges whether or not the mismatch in connection relations can be handled by changing the connection relation indicated by the main device setting information based on the connection state information (S306).

When it is judged that the mismatch can be handled, the AV receiver 100 generates main body setting information where the connection relation indicated by the main body setting information has been changed (S307). The AV receiver 100 then reflects the changed main body setting information (S308). Specifically, when it is judged in Step S304 that the connection relations match, the AV receiver 100 reflects the main body setting information acquired in Step S301, or reflects the main body setting information generated in Step S307 in the original main body setting information. Then, the AV receiver 100 ends the processing. On the other hand, when it is judged in Step S306 that the mismatch cannot be handled by a change, the AV receiver 100 transmits to the portable terminal 400 an instruction to perform a connection correction notification (S309), and returns the processing to Step S302.

In this modified example, there is described a case where the user is not notified of whether or not the mismatch can be handled by a change. But similar to the first modified example, such a notification also can be issued in this modified example as well. The changed main body setting information also can be transmitted to the portable terminal 400.

In the first and second modified examples, even when the user has erroneously connected an HDMI device and an HDMI terminal, as long as the mismatch can be handled by a change in the main body setting information, the mismatch can be handled by a change in the main body setting information, and user convenience can be further improved. More specifically, for example, there is no longer a need to cause the user to correct a connection every time the user makes an error in the connection between the HDMI device(s) and the HDMI terminal(s).

The present invention is not limited to the first and second modified examples. The components described in the first and second modified examples can be replaced with components that are essentially the same, components that provide essentially the same operation and effect, or components capable of achieving the same purpose. For example, in the first and second modified examples, there are mainly described examples where the setting assistance application is installed in the portable terminal 400. But the setting assistance application can be installed in another device, for example, in the AV receiver 100 itself.

Next, a modified example of the second embodiment is described. FIG. 17 is a diagram for illustrating the modified example of the second embodiment. Specifically, an outline of a processing flow by the portable terminal in the second modified example of the second embodiment is illustrated in FIG. 17. A description of points that are the same as in the first and second modified examples of the first embodiment is omitted. The flow outline described below is an example. This modified example is not limited to the following flow outline.

As illustrated in FIG. 17, on the setting screen of the setting assistance application of the portable terminal 400, the user inputs the device(s) (including speaker(s)) that he/she wants to connect (S401). Specifically, for example, the portable terminal 400 acquires the device ID and speaker ID indicating each speaker in accordance with the inputs by the user. In this case, "each speaker" corresponds to, for example, a left front speaker, a right front speaker, a center speaker, a left surround speaker, a right surround speaker, etc.

The portable terminal 400 acquires a recommended connection method (recommended connection information) based on the input device ID(s) and speaker ID(s), and displays the acquired recommended connection method on the screen (S402). The recommended connection information contains information on the connection of each device to the AV receiver 100 and the connection of each speaker to the AV receiver 100.

The user inputs a desired connection method while referring to the recommended connection method displayed in Step S402, and the portable terminal 400 acquires information (desired connection information) indicating that desired connection method (S403). The user connects the device(s) and the speaker(s) to the terminals of the AV receiver 100 while referring to the displayed connection method. The recommended connection method includes information indicating the connection relation between each speaker and the terminals of the AV receiver 100.

The portable terminal 400 generates the main body setting information that the AV receiver 100 needs to have based on the acquired connection information, and transmits the main body setting information to the AV receiver 100 (S404). In this case, the main body setting information contains a setting relating to output to each speaker.

The portable terminal 400 transmits to the AV receiver 100 a sound emission instruction for causing the speaker(s) identified by the main body setting information to emit a sound (S405).

The portable terminal 400 picks up the sound emitted in accordance with the sound emission instruction (S406). In the above-mentioned second embodiment, there is described a case where the AV receiver 100A includes microphones 107A, 107X, and 107Y. But in this modified example, the portable terminal 400 includes a microphone, and sound emitted by that microphone is picked up. In this case, the user can be notified to move the portable terminal 400 to a position at which the portable terminal 400 picks up sound at the predetermined position.

The portable terminal 400 detects the speaker position based on the sound pickup result (S407). The detection is performed by the control unit 42 of the portable terminal 400, for example. The specific detection method is the same as in the above-described second embodiment, and hence a description thereof is omitted here.

The portable terminal 400 judges whether or not the detected speaker position and the position corresponding to the speaker indicated by the desired connection information match (S408). Specifically, for example, the control unit 42 of the portable terminal 400 judges whether or not the speaker position indicated by the main body setting information, which contains information indicating the speaker position, and the detected speaker position match.

When it is judged that those positions match, the portable terminal 400 transmits a reflect instruction to the AV receiver 100 to reflect the main body setting information in the AV receiver 100 (S409). Based on the reflect instruction, the AV receiver 100 reflects the main body setting information.

On the other hand, when it is judged that the connection relations do not match, the portable terminal 400 notifies the user of mismatch connection relation information indicating that the connection relations do not match (S410). Specifically, the notification is performed by, for example, displaying on the display unit 44 mismatch connection relation information indicating, for example, that the center speaker is connected to the connection terminal of the left surround back speaker. The notification also can include, for example, a message prompting the user to correct the connection. The user corrects the speaker connection in accordance with the notification, and the processing then returns to Step S405.

The present invention is not limited to the above-mentioned second modified example. Each of the components described in the above-mentioned modified example can be replaced by substantially the same component, a component having the same action and effect, and a component that can achieve the same object.

For example, in the above-mentioned modified example, there is described a case mainly relating to speaker connections. But similar to the first and second modified examples, a judgment can be performed regarding whether or not the connection relations of the device connections match. Further, in the above-mentioned modified example, there is described a case where detection of the speaker positions is performed on the portable terminal 400 side. But similar to the second embodiment, in the above-mentioned modified example, detection of the speaker positions can be performed on the AV receiver 100 side. In addition, in the above-mentioned modified example, there is described a case where devices including speakers are input, for example. The connection confirmation system, however, also can be configured to input only speakers, and to detect speaker connections.

The connection detection apparatus can be an apparatus having a function of detecting a connection of a device etc. More specifically, for example, the connection detection apparatus corresponds to the AV receiver 100 when detecting connections by using the AV receiver 100, and corresponds to the portable terminal 400 when detecting connections using the portable terminal 400. The setting of the connection mode can include, for example, the above-mentioned main body setting information.

As described above, according to one aspect of the present invention, there is provided a connection confirmation system, including a connection detection apparatus and an information processing apparatus. The connection detection apparatus and the information processing apparatus are configured to communicate with each other. The information processing apparatus including a receiving unit configured to receive an input of a setting relating to a connection mode of a device to be connected to the connection detection apparatus. The connection detection apparatus can include a detection unit configured to detect a connection mode of an actually-connected device. The connection detection apparatus or the information processing apparatus can include a determination unit configured to determine a difference between the actual connection mode detected by the detection unit and the connection mode indicated by the setting received by the receiving unit. The information processing apparatus can include a display unit configured to perform a display based on a determination result of the determination unit.

The connection detection apparatus, for example, can be a sound processing apparatus configured to output to a speaker an audio signal for each channel. The connection mode can be a mode of a connection between the sound processing apparatus and the speaker. The detection unit can be configured to detect an actual connection mode of each channel and each speaker by outputting an audio signal of a test sound to the speaker and picking up a test sound using a microphone.

The information processing apparatus, for example, can be a portable terminal including a computer having a mouse and a keyboard as a receiving unit, and a display device equipped with a touch panel as a receiving unit and a display unit. The information processing apparatus can be configured to execute various kinds of application programs, including a connection confirmation program.

The connections to the connection detection apparatus are not limited to physical connections via a cable, and connections can be made via wireless communication directly between two devices. The term wireless communication refers to, for example, wireless LAN and Bluetooth (registered trademark) communication. The connection mode indicates, for example, the presence of a connection of a device to each connector of the connection detection apparatus, and the number of connected devices.

For example, many related art sound processing apparatuses are configured to automatically detect the speakers that are actually connected, to receive operation inputs by the user using only a power button, a volume change knob, and cursor keys, and to cause a television etc., to display the operation input content and a speaker detection result. Therefore, in the related art sound processing apparatus, input of the connection mode desired by the user is not determined, and a simple user interface is implemented that specializes in displaying the speaker detection result and completion of an operation based on fewer operation inputs. The related art sound processing apparatus, however, implements a simple user interface, and hence there are limits on the display content and the input method. In the related art sound processing apparatus, there are difficulties in directly receiving the speaker connection mode desired by the user, and there are difficulties in displaying a difference between the actual speaker detection result and the speaker connection mode desired by the user.

As a result, the user uses an erroneous connection state as is, and cannot sufficiently produce the sound effect that the related art sound processing apparatus has. In particular, a user who is not used to the sound processing apparatus can often use the sound processing apparatus by using an erroneous connection state as is.

Therefore, the connection confirmation system can be configured to implement, using an information processing apparatus including a receiving unit, an interface capable of receiving input of a volume change etc., as well as the connection mode desired by the user. The display unit is capable of allowing the user to confirm a difference between the connection mode of the sound processing apparatus desired by the user and the actual connection mode detected by the sound processing apparatus by performing a display that is based on the difference.

The display unit can be included in the sound processing apparatus. But it is more desirable to include the display unit in the information processing apparatus. In the connection confirmation system, when the display unit is included in the information processing apparatus, a display that is based on the setting input of the connection mode desired by the user and a difference between the connection mode desired by the user and the detected actual connection mode is implemented by one information processing apparatus, which allows the user to confirm the difference more easily.

More specifically, a display that is based on the input of the connection mode desired by the user and a difference between the connection mode desired by the user and the detected actual connection mode can be realized by a connection confirmation program executable by the information processing apparatus.

There is now described an example where the user desires to generate a sound field by using the connection confirmation program executed by the information processing apparatus and the connection detection apparatus (sound processing apparatus) based on 7-channel surround sound (FL, FR, C, SL, SR, SBL, and SBR channels) including surround back speakers. In this example, the sound processing apparatus is configured to detect, when the user inputs on the connection confirmation program a setting where surround back speakers are to be used, but erroneously connects the surround back speakers to the presence speaker connectors of the sound processing apparatus, that presence speakers are connected. The sound processing apparatus is configured to display, using the information processing apparatus, based on a difference between the connection mode indicated by the detection result (i.e., that surround back speakers are not connected, and presence speakers are connected) and the connection mode indicated by the setting (i.e., that surround back speakers are connected, and presence speakers are not connected).

The difference between the connection mode indicated by the setting and the connection mode indicated by the detection result, however, is not limited to the presence of speaker connections. For example, the difference can be a connection connector error or the fact that there are extra connections (e.g., when more speaker channels are detected than the number of set channels).

The connection confirmation system can allow the user to confirm a difference between the connection mode desired by the user (connection mode indicated by the setting) and the actual connection mode without automatically correcting the connection setting. As a result, the user can confirm whether or not there is an error in the actual connections, and correct the connections to match the desired connection mode.

Thus, with the connection confirmation system, the user can easily set the connection mode to the desired connection mode.

The present invention is not limited to a connection confirmation system. The present invention can be a connection confirmation program executed by an information processing apparatus. That is, the connection confirmation program, for example, can be a connection confirmation program executable in an information processing apparatus, the connection confirmation program being configured to cause the information processing apparatus to execute: a reception step of receiving an input of a setting relating to a connection mode of a device to be connected to a connection detection apparatus; an acquisition step of acquiring, using the connection detection apparatus, a detection result obtained by detecting a connection mode of a device actually connected to the own connection detection apparatus; a determination step of determining a difference between the connection mode indicated by the setting received in the reception step and the actual connection mode acquired in the acquisition step; and a display step of performing a display based on a determination result of the determination step.

Further, the present invention can be a connection confirmation method. The connection confirmation method can be executed with a connection detection apparatus and an information processing apparatus, the connection confirmation method including: a reception step of receiving in the information processing apparatus an input of a setting relating to a connection mode of a device to be connected to the connection detection apparatus; a detection step of detecting a connection mode of a device actually connected to the connection detection apparatus; a determination step of determining a difference between the connection mode indicated by the setting received in the reception step and the actual connection mode acquired in the detection step; and a display step of performing a display based on a determination result of the determination step.

The present invention can also be implemented as a connection detection apparatus. Specifically, for example, the connection detection apparatus can include: a communication unit configured to communicate to and from an information processing apparatus, which includes a receiving unit configured to receive operation inputs; an acquisition unit configured to acquire from the information processing apparatus a setting relating to a connection mode of a device to be connected to the own connection detection apparatus, a detection unit configured to detect a connection mode of a device actually connected to the own connection detection apparatus; a determination unit configured to determine a difference between the actual connection mode detected by the detection unit and the connection mode indicated by the setting acquired by the acquisition unit; and a display unit configured to perform a display based on a determination result of the determination unit.

Further, the acquisition unit can be configured to acquire from the information processing apparatus a setting relating to a connection mode of a device to be connected indirectly to the connection detection apparatus, the detection unit is configured to detect a connection mode of a device actually connected indirectly to the connection detection apparatus, and the determination unit is configured to determine a difference between the connection mode of the device to be indirectly connected indicated by the setting acquired by the acquisition unit and the connection mode of the device actually connected indirectly to the connection detection apparatus detected by the detection unit.

In this aspect, the user connects the connection detection apparatus as a parent device and connects a device connected to the connection detection apparatus as a child device. A grandchild device can be further connected to the child device. The acquisition unit is configured to detect the actual connection mode of the connection between the child device and the grandchild device. As a result, the user can easily set the desired connection mode for the connection mode of the parent device and the child device, and for the connection mode of the child device and the grandchild device.

The information processing apparatus can include a receiving unit, and hence the user can perform setting input regarding the connection mode of a device connected to the connection detection apparatus. Further, the display unit performs a display based on a difference between the connection mode indicated by the setting and the actual connection mode, and hence the user can confirm whether or not there is an error in the connection setting.

The aspects of the present invention thus include the connection confirmation system, the connection confirmation program, the connection confirmation method, and the connection detection apparatus, which can detect and informing a user of a difference between a connection mode of a connected device and the connection mode desired by the user. The sound processing apparatus serving as the connection detection apparatus is configured to detect, when the user inputs on the information processing apparatus a setting where surround back speakers are to be used, but erroneously connects the surround back speakers to the presence speaker connectors of the sound processing apparatus, that presence speakers are connected. The sound processing apparatus can be configured to display based on a difference between the connection mode indicated by the detection result (i.e., that surround back speakers are not connected, and presence speakers are connected) and the connection mode indicated by the setting (i.e., that surround back speakers are connected, and presence speakers are not connected). As a result, the user can confirm that there is an error in the actual connections.

What is claimed is:

1. A connection confirmation system comprising:
   a connection detection apparatus comprising:
      a first communication interface; and
      a first processor configured to implement instructions stored in a first memory; and
   an information processing apparatus comprising:
      a display device;
      a second communication interface; and
      a second processor configured to implement instructions stored in a second memory,
   wherein the connection detection apparatus and the information processing apparatus are configured to communicate with each other using the first and second communication interfaces,
   wherein the first processor is configured to execute:
      a detection task that detects an actual speaker-output connection mode of an actually-connected device connected to the connection detection apparatus; and
      a transmitting task of sending the actual speaker-output connection mode detected by the detection task and a setting relating to a speaker-output connection mode of another device to be connected to the connection detection apparatus to the information processing apparatus, using the first communication interface, and
   wherein the second processor is configured to execute:
      a determination task that determines a difference between the actual speaker-output connection mode and the speaker-output connection mode of the another device; and
      a display task that controls the display device to display a determination result of the determination task.

2. The connection confirmation system according to claim 1, wherein the first and second communication interfaces communicate wirelessly.

3. A connection detection apparatus connectable to a plurality of content-reproduction devices, the connection detection apparatus comprising:
   a communication interface configured to communicate with a portable terminal device that includes a display device; and
   a processor configured to implement instructions stored in a memory and perform a plurality of tasks, including:
      a detection task that detects an actual speaker-output connection mode of an actually-connected content-reproduction device from the actually-connected content-reproduction device connected to the connection detection apparatus;
      an acquisition task that acquires from the portable terminal device, via the communication interface, a setting of a speaker-output connection mode of another content-reproduction device to be connected to the connection detection apparatus;
      a determination task that determines a difference between the actual speaker-output connection mode detected by the detection task and the speaker-output connection mode of the another content-reproduction device indicated by the setting acquired by the acquisition task;
      a transmitting task that transmits, to the portable terminal device via the communication interface, a determination result of the determination task to be displayed on the display device of the portable terminal device; and
      a setting changing task that changes the setting of the speaker-output connection mode of the another content-reproduction device based on the determination result.

4. The connection confirmation system according to claim 1, wherein the first processor is further configured to execute a setting changing task that changes the setting relating to the speaker-output connection mode of the another device based on the actual speaker-output connection mode.

5. The connection detection apparatus according to claim 3, wherein the determination task determines, upon determining that the actual speaker-output connection mode detected by the detection task and the speaker-output connection mode of the another content-reproduction device indicated by the setting acquired by the acquisition task are different, whether or not the setting relating to the connection mode is changeable.

6. The connection detection apparatus according to claim 5, wherein the setting changing task changes the setting relating to the speaker-output connection mode of the another content-reproduction device when the determining task determines that the setting relating to the speaker-output connection mode of the another content-reproduction device is changeable.

7. The connection detection apparatus according to claim 3, wherein the connection detection apparatus is included in a sound processing apparatus.

8. The connection detection apparatus according to claim 7, wherein:
   the sound processing apparatus is configured to output to a speaker an audio signal for each channel,
   the speaker-output connection mode comprises a mode of connecting between the sound processing apparatus and the speaker, and
   the detection task detects an actual speaker-output connection mode of each channel and the respective speaker by outputting an audio signal of a test sound to the respective speaker and picking up a test sound using a microphone.

9. The connection confirmation system according to claim 1, wherein the information processing apparatus is in a form of a portable terminal.

10. A connection confirmation method for a connection detection apparatus connectable to a plurality of content-reproduction devices and includes a communication interface configured to communicate with a portable terminal device that includes a display device, the connection confirmation method comprising:

a detection step of detecting, with the connection detection apparatus, an actual speaker-output connection mode of an actually-connected content-reproduction device actually connected to the connection detection apparatus;

an acquisition step of acquiring from the portable terminal device, via the communication interface of the connection detection apparatus, a setting of a speaker-output connection mode of another content-reproduction device to be connected to the connection detection apparatus;

a determination step of determining a difference between the actual speaker-output connection mode detected in the detection step and the speaker-output connection mode of the another content-reproduction device indicated by the setting acquired in the acquisition step;

a transmitting step of transmitting, to the portable terminal device via the communication interface, a determination result of the determination step to be displayed on the display device of the portable terminal device; and a setting changing step of changing the setting of the speaker-output connection mode of the another content-reproduction device based on the determination result.

* * * * *